(12) United States Patent
Nakano et al.

(10) Patent No.: US 10,320,254 B2
(45) Date of Patent: Jun. 11, 2019

(54) PERMANENT MAGNET MOTOR AND ELECTRIC POWER STEERING APPARATUS

(71) Applicant: Mitsubishi Electric Corporation, Tokyo (JP)

(72) Inventors: Masatsugu Nakano, Tokyo (JP); Yu Hirotani, Tokyo (JP); Yuji Takizawa, Tokyo (JP); Satoru Akutsu, Tokyo (JP); Toyoaki Udo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 183 days.

(21) Appl. No.: 14/783,104

(22) PCT Filed: Jul. 22, 2013

(86) PCT No.: PCT/JP2013/069737
§ 371 (c)(1),
(2) Date: Oct. 8, 2015

(87) PCT Pub. No.: WO2015/011747
PCT Pub. Date: Jan. 29, 2015

(65) Prior Publication Data
US 2016/0036281 A1    Feb. 4, 2016

(51) Int. Cl.
*H02K 1/16* (2006.01)
*H02K 3/28* (2006.01)
(Continued)

(52) U.S. Cl.
CPC .............. *H02K 3/28* (2013.01); *H02K 1/16* (2013.01); *H02K 1/2706* (2013.01); *H02K 7/14* (2013.01);
(Continued)

(58) Field of Classification Search
CPC ........ H02K 1/27–1/2793; H02K 11/00–11/40; H02K 3/00–3/528
(Continued)

(56) References Cited

U.S. PATENT DOCUMENTS

| 7,233,092 B2* | 6/2007 | Murakami | H02K 1/278 |
| | | | 310/156.28 |
| 2003/0107290 A1* | 6/2003 | De Filippis | H02K 1/146 |
| | | | 310/216.008 |

(Continued)

FOREIGN PATENT DOCUMENTS

| JP | 07-264822 A | 10/1995 |
| JP | 2003-244884 A | 8/2003 |

(Continued)

OTHER PUBLICATIONS

Communication dated Mar. 31, 2017, from the European Patent Office in counterpart European application No. 13889887.9.
(Continued)

*Primary Examiner* — Thomas Truong
(74) *Attorney, Agent, or Firm* — Sughrue Mion, PLLC; Richard C. Turner

(57) ABSTRACT

A permanent magnet motor is provided in which, in flanges each provided in a plurality of teeth, lateral side portions of the flanges oppose to lateral side portions the flanges being provided in adjacent teeth and protruding in a circumferential direction of a stator core; when a height in the lateral side portion of the flanges in a radial direction of the stator core is defined as "h," and the length of a magnetic air gap is defined as "g," the relationship "1≤h/g≤2" is held; and also, when a circumferential distance between opposing faces of the flanges being adjacent to each other is defined as "a," the relationship "a/g≥0.2" is satisfied.

14 Claims, 13 Drawing Sheets

(51) Int. Cl.
*H02K 11/00* (2016.01)
*B62D 5/04* (2006.01)
*H02K 29/03* (2006.01)
*H02K 29/08* (2006.01)
*H02K 11/215* (2016.01)
*H02K 11/33* (2016.01)
*H02K 1/27* (2006.01)
*H02K 7/14* (2006.01)
*H02P 25/22* (2006.01)

(52) U.S. Cl.
CPC ....... *H02K 11/0094* (2013.01); *H02K 11/215* (2016.01); *H02K 11/33* (2016.01); *H02K 29/03* (2013.01); *H02K 29/08* (2013.01); *B62D 5/04* (2013.01); *H02K 1/165* (2013.01); *H02K 1/276* (2013.01); *H02K 1/278* (2013.01); *H02K 1/2773* (2013.01); *H02K 2201/03* (2013.01); *H02K 2213/03* (2013.01); *H02P 25/22* (2013.01)

(58) Field of Classification Search
USPC ..... 310/156.01–156.84, 68 D, 179, 180, 184
See application file for complete search history.

(56) References Cited

U.S. PATENT DOCUMENTS

| | | |
|---|---|---|
| 2003/0155833 A1 | 8/2003 | Aoyama et al. |
| 2006/0220486 A1 | 10/2006 | Miyashita et al. |
| 2007/0216253 A1* | 9/2007 | Shendi .................. H02K 1/165 |
| | | 310/216.012 |
| 2010/0181948 A1 | 7/2010 | Taniguchi et al. |
| 2010/0270100 A1* | 10/2010 | Ikeno .................. B62D 5/0403 |
| | | 180/443 |
| 2010/0295403 A1* | 11/2010 | Morita .................. H02K 1/146 |
| | | 310/156.78 |
| 2011/0181230 A1* | 7/2011 | Yamada ............... H02K 1/2746 |
| | | 318/724 |
| 2011/0285243 A1 | 11/2011 | Taniguchi |
| 2012/0139380 A1* | 6/2012 | Taniguchi ............ H02K 1/2746 |
| | | 310/156.48 |
| 2012/0169163 A1 | 7/2012 | Imai et al. |
| 2012/0326550 A1 | 12/2012 | Kinpara et al. |
| 2013/0057103 A1* | 3/2013 | Han ..................... H02K 1/2773 |
| | | 310/156.12 |
| 2014/0191628 A1 | 7/2014 | Nakano et al. |

FOREIGN PATENT DOCUMENTS

| | | |
|---|---|---|
| JP | 2005-210828 A | 8/2005 |
| JP | 2006-288028 A | 10/2006 |
| JP | 2010-166727 A | 7/2010 |
| JP | 2011-250508 A | 12/2011 |
| JP | 2012-157236 A | 8/2012 |
| WO | 2013/094075 A1 | 6/2013 |

OTHER PUBLICATIONS

Communication dated Jun. 7, 2016, from the Japanese Patent Office in counterpart application No. 2015-528018.
International Search Report for PCT/JP2013/069737 dated Oct. 15, 2013.
Communication dated May 18, 2017 issued by the State Intellectual Property Office of the People's Republic of China in counterpart application No. 201380078438.5.
Jian Huang et al., Shanghai Scientific & Technical Publishers, pp. 178-180, 224-228, and 262-267, Jun. 2010 (11 pages total).
Communication dated Dec. 4, 2017, from State Intellectual Property Office of the P.R.C. in counterpart application No. 201380078438.5.
Communication dated Jun. 4, 2018 from the State Intellectual Property Office of the P.R.C. in counterpart application No. 201380078438.5.
Communication dated Dec. 29, 2018 issued by the State Intellectual Property Office of the People's Republic of China in counterpart application No. 201380078438.5.
Communication dated Jan. 16, 2019 issued by the Indian Intellectual Property Office in counterpart application No. 201647000063.

* cited by examiner

Relationships of h/g, Torque and Mq12/Lq1

Relationship of a/g and Mq12/Lq1

PERMANENT MAGNET MOTOR AND ELECTRIC POWER STEERING APPARATUS

CROSS REFERENCE TO RELATED APPLICATIONS

This application is a National Stage of International Application No. PCT/JP2013/069737 filed Jul. 22, 2013, the contents of all of which are incorporated herein by reference in their entirety.

TECHNICAL FIELD

The present invention relates to a permanent magnet motor what is called a multi-phase multi-structured permanent magnet motor including multi-phase stator windings made of a plurality of windings in multiple structures, and to an electric power steering apparatus including the permanent magnet motor for a wheeled vehicle.

BACKGROUND ART

A permanent magnet motor including multi-phase multi-structured stator windings is well known and has features in which torque pulsation or ripple(s) is reduced by driving the multi-phase multi-structured stator windings each at different phases, and also, a fail-safe function is enhanced due to multi-structuring the multi-phase windings. Therefore, such a permanent magnet motor is used as a motor in an electric power steering apparatus for a wheeled vehicle such as an automotive vehicle, for example.

A conventional multi-phase multi-structured permanent magnet motor disclosed in Patent Document 1 includes multi-phase stator windings made of a plurality of windings in multiple structures, and has a configuration in which each of the windings does not commonly use magnetic paths in a gap between the rotor and the stator.

RELATED ART DOCUMENT

[Patent Document 1] Japanese Laid-Open Patent Publication No. H07-264822

SUMMARY OF THE INVENTION

Problems to be Solved by the Invention

Because the conventional multi-phase multi-structured permanent magnet motor disclosed in Patent Document 1 has a structure of concentrated winding in which armature windings are concentratedly wound on teeth, so that there arises a problem in that a winding factor is small according to the short-pitch winding, and, as a result, the quantity of permanent magnet use increases, resulting in increase in costs.

Meanwhile, in a case of a multi-phase multi-structured permanent magnet motor in which a structure is of distributed winding being multi-phase and multi-structured, and also magnetic paths are commonly used between multi-structured windings each other, there arises a problem in that the magnetic coupling of armature windings each other becomes stronger, so that the controllability is lowered. Particularly, in a configuration in which portions of a rotor core exist on the side nearer to a stator than the middle diameter between the maximum outer diameter and the minimum outer diameter of permanent magnets, there significantly arises a problem in that, because inductance becomes larger, an effect of a field-weakening control can be efficiently exerted, while on the contrary, the magnetic coupling of armature windings each other becomes stronger.

The present invention has been directed at solving these problems in a conventional multi-phase multi-structured permanent magnet motor described above, and an object of the invention is to provide a permanent magnet motor which can weaken the magnetic coupling of different groups of armature windings each other, and to enhance the controllability.

In addition, an object of the present invention is to provide an electric power steering apparatus including a permanent magnet motor which can weaken, in the multi-phase multi-structured stator windings, the magnetic coupling of different groups of armature windings each other, and to enhance the controllability.

Means for Solving the Problems

A permanent magnet motor according to the present invention comprises:

a rotor including a rotor core fixed on a motor shaft, and permanent magnets fixed on the rotor core; and a stator including a stator core, whose inner circumferential face opposes to an outer circumferential face of the rotor by means of a magnetic air gap, having a plurality of slots for accommodating armature windings, and a plurality of teeth, the permanent magnet motor is characterized in that:

the armature windings are constituted of a plurality of groups of multi-phase windings;

the plurality of groups of multi-phase windings is supplied with electric power from individual inverters in every one of respective groups;

portions of the rotor core exist on a side nearer to the stator than a middle diameter between a maximum outer diameter and a minimum outer diameter of the permanent magnets;

the plurality of teeth each include respective flanges;

the flanges each have a lateral side portion thereof opposing to a lateral side portion of a flange being provided in the teeth adjacent to each other and protruding in a circumferential direction of the stator core;

when a height in the lateral side portion of the flanges in a radial direction of the stator core is defined as h, and a length of the magnetic air gap is defined as g, relationship $1 \leq h/g \leq 2$ is held; and also, when a circumferential distance between opposing faces of the flanges (56) being adjacent to each other is defined as a, relationship $a/g \geq 0.2$ is satisfied.

In addition, an electric power steering apparatus according to the present invention on which the permanent magnet motor is mounted, and torque is produced by the permanent magnet motor so as to assist steering of a driver, is characterized in that the permanent magnet motor is placed in such a direction that the motor shaft is in parallel with an extending direction of a rack shaft for driving a steering wheel of a wheeled vehicle.

Effects of the Invention

According to the permanent magnet motor of the present invention, such an effect can be achieved that the magnetic coupling of different groups of armature windings each other can be weakened, so that the controllability is enhanced, and at the same time, an effect of a field-weakening control can be efficiently exerted.

In addition, according to the electric power steering apparatus of the present invention, such an effect is achieved that a large quantity of torque-ripple reduction is made possible, and also the magnetic coupling can be weakened, so that the apparatus can also be applied to a large-size wheeled vehicle, and fuel consumption of the wheeled vehicle can be lowered. There exists an effect that the controllability is enhanced, and at the same time, the apparatus can be reduced in its size.

EMBODIMENTS FOR CARRYING OUT THE INVENTION

Embodiment 1

Figure 14:
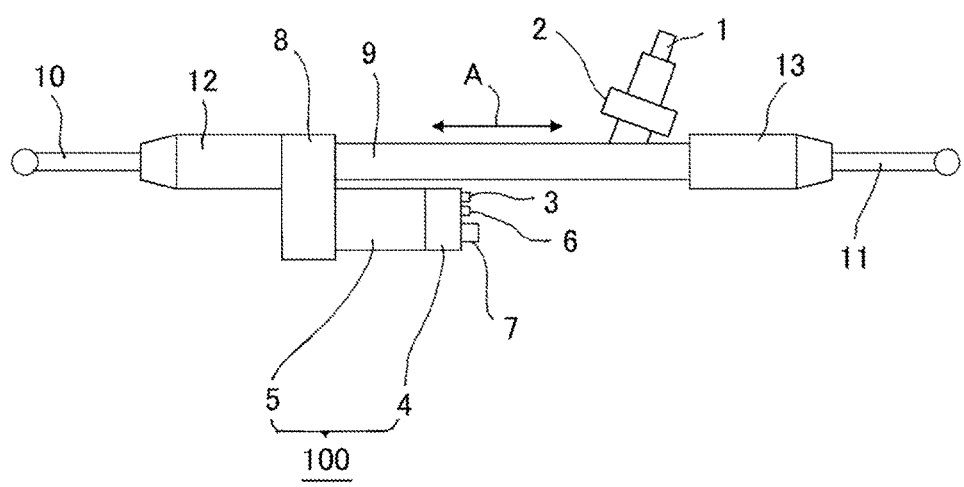
FIG. 14 is an illustrative diagram for explaining the electric power steering apparatus including the permanent magnet motor according to Embodiment 1 of the present invention.

FIG. 14 is an illustrative diagram for explaining an electric power steering apparatus including a permanent magnet motor according to Embodiment 1 of the present invention. In FIG. 14, a driver of a wheeled vehicle such as an automotive vehicle steers a steering wheel (not shown in the figure), and its steering torque by the driver is transmitted to a steering shaft 1 by means of a steering-wheel shaft (not shown in the figure). At this time, steering torque detected by a torque sensor 2 is converted into an electric signal, and transferred to an ECU (Electronic Control Unit) 4 by way of a cable (not shown in the figure) and through a first connector 3. The ECU 4 includes a control board, and inverter circuits (not shown in the figure) for driving the permanent magnet motor 5 according to Embodiment 1 of the present invention as will be described later. Note that, in the following explanation, the permanent magnet motor 5 may simply be referred to also as the motor.

Meanwhile, information of the wheeled vehicle such as a wheel speed(s) thereof is converted into an electric signal, and is transferred to the ECU 4 by way of a second connector 6. In the ECU 4, required assist torque is calculated from the information of the wheeled vehicle such as steering torque and a wheel speed(s) thereof described above, and electric currents are supplied to the motor 5 by way of inverters. The motor 5 is placed in an orientation parallel with a moving direction of a rack shaft as a motor's shaft direction is shown by the double arrows "A." In addition, electric source-power into the ECU 4 is supplied form a battery and/or an alternator by way of a power-source connector 7.

Torque produced by the motor 5 undergoes deceleration by a gear box 8 in which a belt (not shown in the figure) and a ball screw (not shown in the figure) are built, and thrust force is produced to move the rack shaft (not shown in the figure) existing inside of a housing 9 in a direction shown by the double arrows "A," so that steering force of the driver is assisted. According to the arrangement that the rack shaft moves in the direction shown by the double arrows "A," right and left tie-rods 10 and 11 of the wheeled vehicle move, and tire-wheels undergo turn-directions, so that the wheeled vehicle can be cornered. The driver can corner the wheeled vehicle with lesser steering force assisted by the torque of the motor 5. Note that, right and left rack boots 12 and 13 of the wheeled vehicle are provided to prevent the ingress of a foreign object into the electric power steering apparatus. Note also that, the motor 5 and ECU 4 are integrally fixed, and constitute an electric drive device 100.

Figure 1:
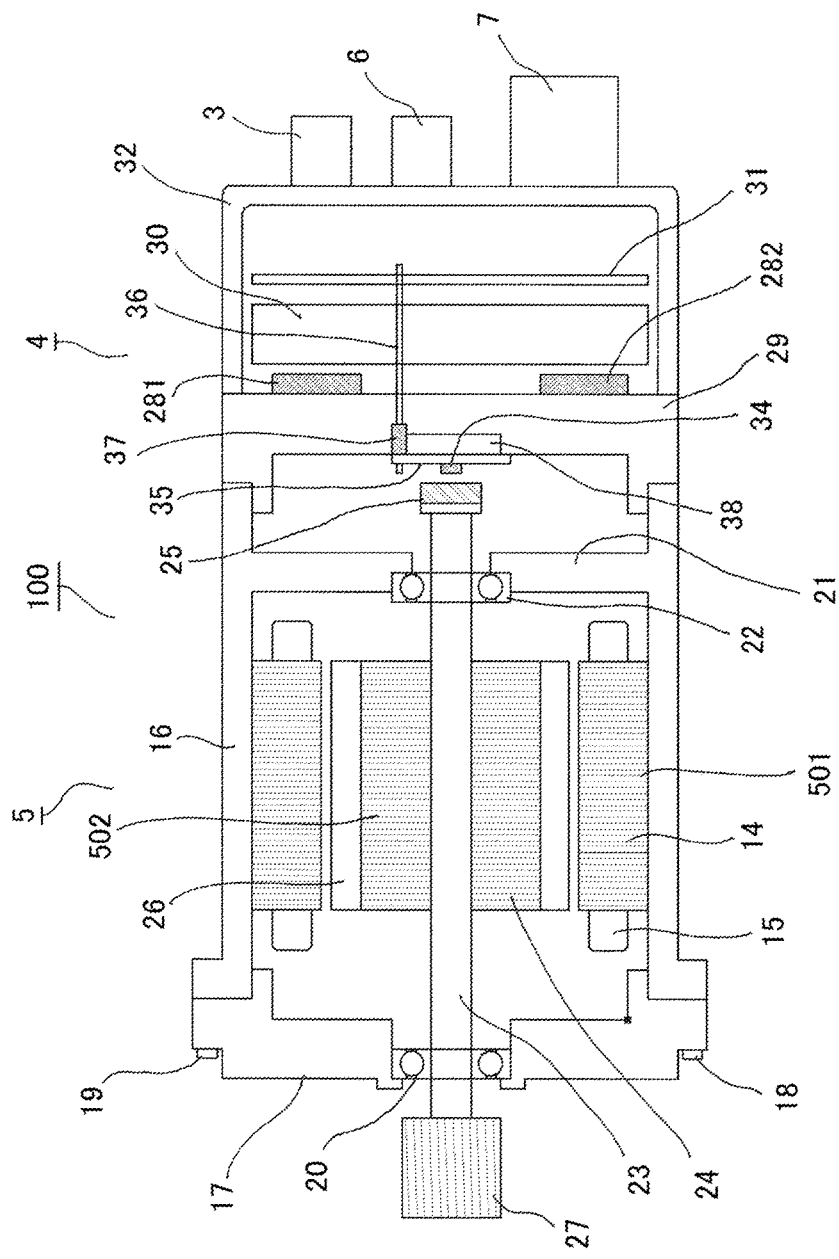
FIG. 1 is an illustrative diagram for explaining an electric drive device in an electric power steering apparatus according to Embodiment 1 of the present invention.

Next, the explanation will be made for the electric drive device 100 described above. FIG. 1 is an illustrative diagram for explaining the electric drive device in the electric power steering apparatus according to Embodiment 1 of the present invention. The electric drive device 100 illustrated in FIG. 1 has a structure in which the motor 5 and ECU 4 according to Embodiment 1 of the present invention are integrally fixed. In FIG. 1, the explanation will be made first for the permanent magnet motor 5. The motor 5 has a stator core 14 formed by laminating electrical steel sheets, armature windings 15 accommodated in slots of the stator core 14 as will be described later, and a frame 16 for fixing the stator core 14. One end-portion of the frame 16 in an axial direction is fixed to a motor housing 17 by bolts 18 and 19.

On the motor housing 17, a first bearing 20 is fixed. In addition, in an inner circumferential portion of a wall portion 21 formed on the other end-portion of the frame 16 in the axial direction, a second bearing 22 is fixed. Although the wall portion 21 is integrally formed with the frame 16, the wall portion may be separately formed therefrom. On a motor shaft 23, a rotor core 24 formed by laminating electrical steel sheets is fixed by press-fit. The motor shaft 23 is supported by means of the first bearing 20 and the second bearing 22 rotationally movable with respect to the motor housing 17 and the frame 16.

On one end-portion of the motor shaft 23 in the axial direction, namely, on the side of the output shaft, a pulley 27 is inserted by press-fit. The pulley 27 works to transmit driving force of the motor 5 to a belt (not shown in the figure) of the electric power steering apparatus. On the other end-portion of the motor shaft 23 in the axial direction, a sensor permanent-magnet 25 is fixed. On the rotor core 24 described above, permanent magnets 26 are fixed. Note that, in FIG. 1, an example is shown in which the permanent magnets 26 are fixed on a surface of the rotor core 24; however, a structure may be adopted in which they are embedded in the rotor core 24. The description for these structures will be made later in detail.

Next, the explanation will be made for the ECU 4. The ECU 4 is provided with the first connector 3 for receiving a signal from the torque sensor 2 described above, the second connector 6 for acquiring the information of the wheeled vehicle such as a wheel speed(s) thereof, and the power-source connector 7 for supplying electric source-power. In addition, for the ECU 4, a first inverter circuit and a second inverter circuit are provided in order to drive the motor as will be described later. The first inverter circuit has a first switching device group 281 made of six MOS-FETs or the like. The second inverter circuit has a second switching device group 282 made of six MOS-FETs or the like.

As for each of the switching devices in the first and second switching device group 281 and 282, a case is conceivable as exemplary configurations in which flip chips or microchips are mounted on a DBC (Direct Bonded Copper) board, microchips are molded by a resin to form a module, and the like. Each of the switching devices generates heat, because electric currents for driving the motor flow. For dealing therewith, each of the switching devices is so structured that the device contacts with a heat sink 29 by means of adhesive, an insulating sheet and the like to dissipate the heat therethrough.

In the first and second inverter circuits, smoothing capacitors, coils for noise removal, power relays, busbars for electrically connecting these parts, and so on are provided other than the switching devices described above; however, they are omitted in FIG. 1. The busbars are integrally formed with a resin, and form an intermediate member 30. In addition, adjacent to the intermediate member 30, a control board 31 is provided. This control board 31 transmits control signals to the first and second switching device group 281 and 282 so as to suitably drive the motor 5, based on the information received from the first and second connectors 3 and 6.

The control signals are transferred by connection members (not shown in the figure) which electrically connect between the control board 31, and each of the switching devices of the first and second switching device group 281 and 282. These connection members are fixed on semiconductor devices and the control board 31 by wire bonding, press-fit, soldering, and so on. The first and second inverter circuits constituted of these semiconductor devices, and the control board 31 are covered by an ECU casing 32. The ECU casing 32 may be formed of a resin or may be formed of a metal of aluminum or the like, or may be in a configuration forming a combination of a resin and a metal of aluminum or the like. As for a placement of the control board 31, the control board is placed along a surface perpendicular to an axial direction of the motor shaft 23 of the motor 5.

On a side face of the heat sink 29 opposing to the motor 5, a sensor unit 33 is placed. The sensor unit 33 has a magnetic sensor 34, a sensor board 35, a sensor connection member 36, and a sensor supporting member 37; the sensor board 35 on which the magnetic sensor 34 is mounted is fixed on the heat sink 29 by a screw(s) (not shown in the figure).

The magnetic sensor 34 is placed on the same axis as the axial center of the motor shaft 23, and is also placed at a position mutually corresponding to the sensor permanent-magnet 25; by detecting a magnetic field in which the sensor permanent-magnet 25 generates and detecting the orientation of the magnetic field, the magnetic sensor detects a rotor's rotation angle of the motor 5. The sensor connection member 36 is held by the sensor supporting member 37, and the member electrically connects the sensor board 35 of the sensor unit 33, and the control board 31 to each other. These connections may also be made by press-fit, or by soldering. Note that, because the sensor connection member 36 is required to pass through the heat sink 29 and the intermediate member 30, a through hole (not shown in the figure) is provided for the heat sink 29 and the intermediate member 30 so that the sensor connection member 36 passes through them. Note also that, though not shown in the figure, the intermediate member 30 is configured to provide a guide therein for positioning the sensor connection member 36.

In FIG. 1, a recessed portion 38 is provided in the heat sink 29, so that the distance is increased between the magnetic sensor 34 mounted on the sensor board 35 of the sensor unit 33, and the top face of the heat sink 29, namely, the bottom face of the recessed portion 38. The heat sink 29 is fixed on the frame 16 of the motor 5 by means of a screw(s), a shrink fit, and the like. According to the above, by fixing the heat sink 29 on the frame 16 of the motor 5, the heat of the heat sink 29 can be transferred to the frame 16.

The ECU 4 supplies suitable drive currents to the armature windings 15 of the motor 5 in accordance with a rotor's rotation angle of the motor 5 being detected by the sensor unit 33.

Note that, in FIG. 1, an example is shown in which the magnetic sensor 34 is mounted on the sensor board 35, other than the control board 31; however, as a configuration in which the magnetic sensor is mounted on the control board 31, a structure may also be adopted in such a manner that magnetic flux leaking from the sensor permanent-magnet 25 through the heat sink 29 is detected. In addition, the configuration may also be taken so that the positional relationship between the intermediate member 30 and the control board 31 is reversed for their placement of FIG. 1. Moreover, in FIG. 1, a configuration of applying the magnetic sensor 34 is shown as the configuration of the sensor unit for detecting a position of the rotor; however, it is needless to say that a resolver may be applied to the configuration.

Figure 2:
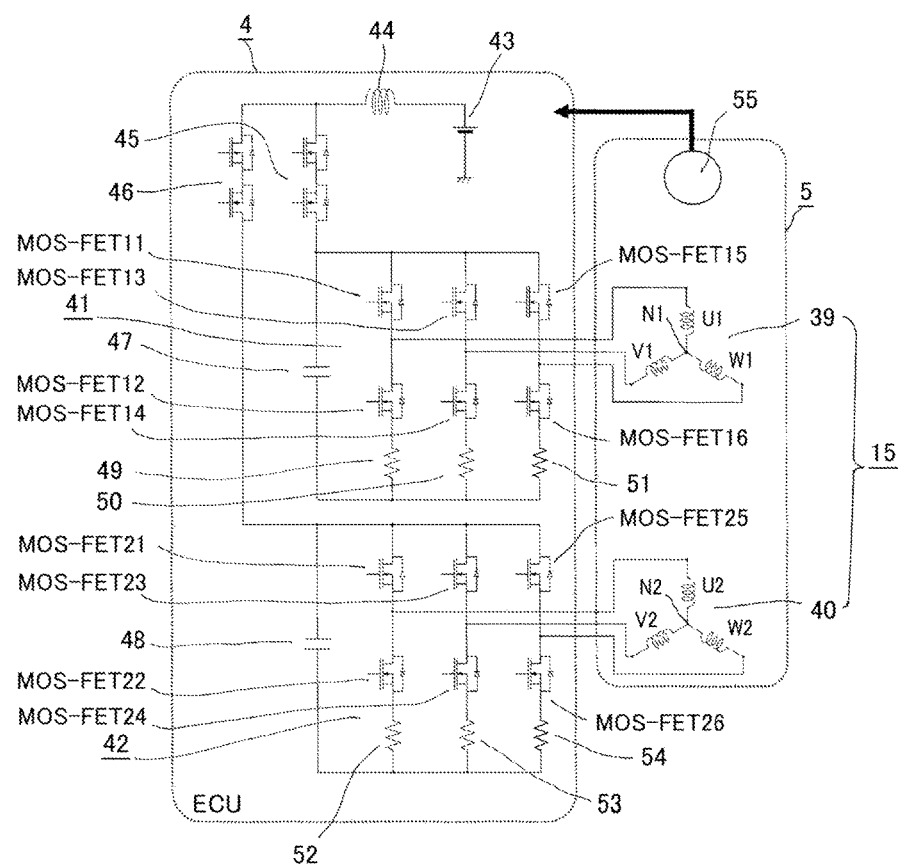
FIG. 2 is an illustrative diagram for explaining circuits of a permanent magnet motor and an ECU according to Embodiment 1 of the present invention.

Next, the explanation will be made for a circuit configuration of the portions of inverters in the ECU 4. FIG. 2 is an illustrative diagram for explaining circuits of the motor and the ECU according to Embodiment 1 of the present invention. Note that, for the sake of simplicity in FIG. 2, the armature windings are only shown for the motor 5. The armature windings 15 of the motor 5 are constituted of a first armature winding 39 made of a first phase-U winding U1, a first phase-V winding V1 and a first phase-W winding W1, and a second armature winding 40 made of a second phase-U winding U2, a second phase-V winding V2 and a second phase-W winding W2. In FIG. 2, the first and second armature windings 39 and 40 are shown as Y connections; however, they may also be in Δ connections.

In the ECU 4 shown in FIG. 2, the portions of electric power circuits of the inverters are only shown for the sake of simplicity. Into the ECU 4, a DC voltage is supplied from an electric power source 43 such as a battery by way of a coil 44 for noise removal. The ECU 4 includes two groups of inverter circuits: a first inverter circuit 41 and a second inverter circuit 42. Into the first inverter circuit 41, the DC voltage is supplied from the electric power source 43 by way of the coil and a first power relay 45, and the first inverter circuit supplies three-phase currents to the first armature winding 39. Into the second inverter circuit 42, the DC voltage is supplied from the electric power source 43 by way of the coil 44 and a second power relay 46, and the second inverter circuit supplies three-phase currents to the second armature winding 40. Note that in FIG. 2, the electric power source 43 is shown as if it exist inside of the ECU 4; however, as for the electric power source 43 under actual circumstances, electric power is supplied from a power source, being external to the ECU 4, such as an onboard battery by way of connectors.

The first and second power relays 45 and 46 each are constituted of two MOS-FETs, and operate so that, by turning off the MOS-FETs at the time of a malfunction or the like, an excessively large current does not flow through each of the inverter circuits 41 and 42. Note that, in FIG. 2, the electric power source 43, the coil 44, the first power relay 45 and the second power relay 46 are connected in this order; however, it is needless to say that the first power relay 45 and the second power relay 46 may be connected at a position nearer to the electric power source 43 than the coil 44.

A first smoothing capacitor 47 is connected across input terminals of the first inverter circuit 41, and a second smoothing capacitor 48, connected across input terminals of the second inverter circuit 42. Note that, in FIG. 2, the first and second smoothing capacitors 47 and 48 each constitute one capacitor; however, it is needless to say that a plurality of capacitors may be constituted so that the capacitors are connected in parallel with one another.

The first and second inverter circuits 41 and 42 each constitute a three-phase bridge circuit using six MOS-FETs. The first inverter circuit 41 includes a first arm in which a MOS-FET 11 and a MOS-FET 12 are connected in series, a second arm in which a MOS-FET 13 and a MOS-FET 14 are connected in series, and a third arm in which a MOS-FET 15 and a MOS-FET 16 are connected in series; these first through third arms are connected in parallel with one another. On a GND (ground potential) side of the MOS-FET 12, the MOS-FET 14 and the MOS-FET 16 each positioned at lower levels of those first through third arms, shunt resistors 49, 50 and 51 are connected one by one, respectively.

Similarly, the second inverter circuit 42 includes a first arm in which a MOS-FET 21 and a MOS-FET 22 are connected in series, a second arm in which a MOS-FET 23 and a MOS-FET 24 are connected in series, and a third arm in which a MOS-FET 25 and a MOS-FET 26 are connected in series; these first through third arms are connected in parallel with one another. On a GND (ground potential) side of the MOS-FET 22, the MOS-FET 24 and the MOS-FET 26 each positioned at lower levels of those first through third arms, shunt resistors 52, 53 and 54 are connected one by one, respectively.

Each of the shunt resistors 49 through 54 described above is used for detecting an electric current value. Note that, an example is shown in which the shunt resistors are provided in the number of three for every one of the first and second inverter circuits 41 and 42; however, it may be adopted that two shunt resistors are provided for every one of the first and second inverter circuits 41 and 42, and it is needless to say that, because an electric current detection is possible even with one shunt resistor, such configuration may also be adopted.

In supplying electric currents from the first inverter circuit 41 into the motor 5, as illustrated in FIG. 2, a current is supplied from the series connected portion between the MOS-FET 11 and the MOS-FET 12 to a phase-U1 of the first armature winding 39 of the motor 5 by way of busbars or the like; a current is supplied from the series connected portion between the MOS-FET 13 and the MOS-FET 14 to a phase-V1 of the first armature winding 39 of the motor 5 by way of busbars or the like; and a current is supplied from the series connected portion between the MOS-FET 15 and the MOS-FET 16 to a phase-W1 of the first armature winding 39 of the motor 5 by way of busbars or the like.

In supplying electric currents from the second inverter circuit 42 into the motor 5, as illustrated in FIG. 2, a current is supplied from the series connected portion between the MOS-FET 21 and the MOS-FET 22 to a phase-U2 of the second armature winding 40 of the motor 5 by way of busbars or the like; a current is supplied from the series connected portion between the MOS-FET 23 and the MOS-FET 24 to a phase-V2 of the second armature winding 40 of the motor 5 by way of busbars or the like; and a current is supplied from the series connected portion between the MOS-FET 25 and the MOS-FET 26 to a phase-W2 of the second armature winding 40 of the motor 5 by way of busbars or the like.

In FIG. 2, motor relays are not shown which electrically break between the motor 5 and the first and second inverter circuits 41 and 42 when some kind of malfunction occurs in the ECU 4; however, in order to provide the motor relays, a case is conceivable in which they are provided at the neutral points N1 an N2 of the first and second armature windings 39 and 40, and a case, in which they are provided between the motor 5 and the first and second inverter circuits 41 and 42.

The first and second inverter circuits 41 and 42 performs switching each of the MOS-FETs by transmitting to them signals from control circuits (not shown in the figure) in accordance with a rotor's rotation angle of the motor 5 detected by means of a rotation angle sensor 55 included in the motor 5, so that desired three phase currents are supplied into the first and second armature windings 39 and 40. Note that, as for the rotation angle sensor 55, the magnetic sensor is used, for example. To be specific, used are a configuration which combines a permanent magnet, and a GMR (Giant Magneto Resistive effect) sensor or an AMR (Anisotropic Magneto Resistance) sensor, a resolver, etc.

Figure 3:
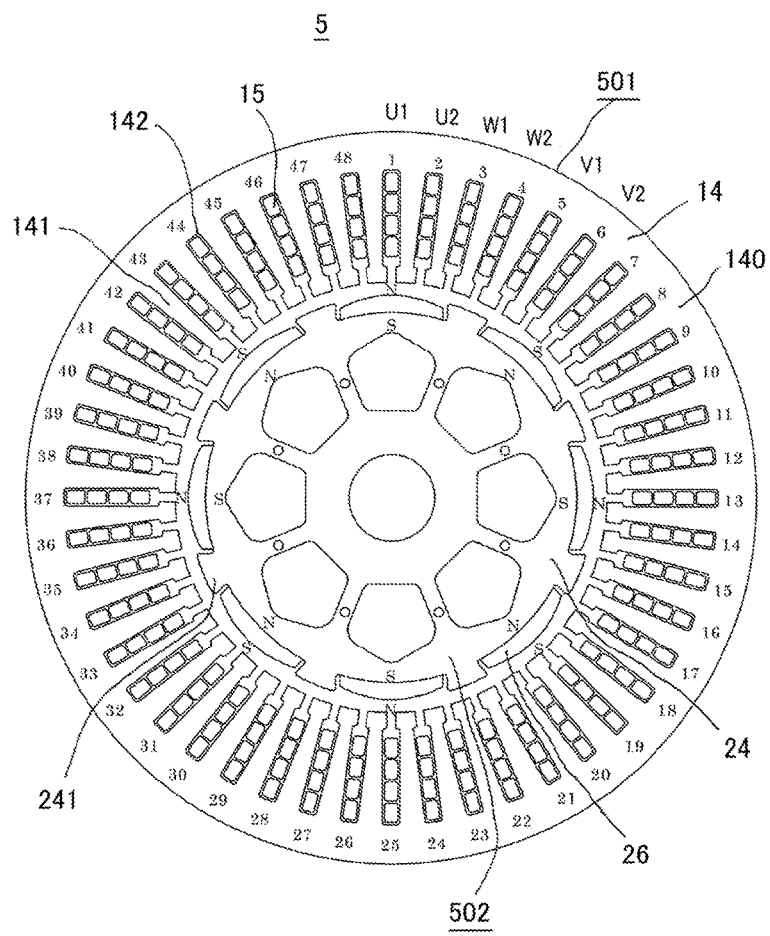
FIG. 3 is a cross section diagram illustrating a permanent magnet motor according to Embodiment 1 of the present invention.

Next, the explanation will be made in more detail for the permanent magnet motor according to Embodiment 1 of the present invention. FIG. 3 is a cross section diagram illustrating the permanent magnet motor according to Embodiment 1 of the present invention. In FIG. 1 through FIG. 3, a stator 501 is provided which has an inner circumferential face opposing, through a gap, to an outer circumferential face of a rotor 502. The stator 501 has the armature windings 15 made of the aforementioned the first armature winding 39 and the second armature winding 40, and the stator core 14. The stator core 14 is constituted of an annular core back 140 formed by a magnetic material of electrical steel sheets or the like, and teeth 141 extending from the core back 140 toward the inner radial side.

The armature windings 15 are accommodated in slots 142 provided between the adjacent teeth 141. Although not shown in the figures, insulating paper or the like is inserted between the armature windings 15 and the stator core 14, so that the electrical insulation is secured therebetween. The teeth 141 are provided in the number of 48 in total, and therefore, the slots 142 are also in the number of 48. In one of the slots 142, coils of the armature windings 15 are accommodated.

As described above, the first armature winding 39 is constituted of three phases of the phase-U1, the phase-V1 and the phase-W1, and the second armature winding 40, constituted of three phases of the phase-U2, the phase-V2 and the phase-W2. As for the placements of windings, they are placed from a first slot (1) in the order of U1, U2, W1, W2, V1 and V2 as shown in FIG. 3; the windings are thereafter placed from a seventh slot (7) also in the order of U1, U2, W1, W2, V1 and V2, and are placed up to a 48th slot (48) in a similar order. Namely, the first armature winding 39 and the second armature winding 40 are placed in the adjacent slots 142.

However, the armature windings are placed so that, in the phase-U1 of the first slot (1) and the phase-U1 of the seventh slot (7), the orientations of their electric currents are mutually reversed. Namely, the configuration of distributed winding is taken in which the armature windings are wound from the first slot (1) to the seventh slot (7). Therefore, it can be said that the armature windings each are placed to bridge the six teeth in total. This corresponds to the electrical angle of 180 degrees, so that a short-pitch factor becomes "1"; and thus, magnetic flux in which the permanent magnets 26 generate can be effectively utilized, so that such an effect can be achieved as obtaining a motor of a small size and high torque, and as reducing the costs in comparison with a motor having a small winding factor, because the quantity of the permanent magnets 26 can be reduced.

In an inside space portion of the stator 501, the rotor 502 is provided that includes the permanent magnets 26 on a surface of the rotor core 24. The permanent magnets 26 are placed side by side in an equal interspace therebetween, in the number of eight, in a circumferential direction of the rotor 502, and take the configuration of eight magnetic poles. Magnetic polarities of the adjacent permanent magnets 26 are reversed to each other. In addition, in the rotor core 24, eight protrusion portions 241 are provided; nonmagnetic gaps for reducing leakage flux are provided between the protrusion portions 241 and the permanent magnets 26. These protrusion portions 241 have an effect to reduce an air gap between the stator 501 of the motor 5 and the rotor 502 thereof, resulting in increase in the inductance. As a result, the field-weakening control facilitates exerting its effect, so that such an effect can be achieved as enhancing the torque at the time of fast rotation.

The rotor core 24 is formed by laminating electrical steel sheets or the like, and the electrical steel sheets are mutually joined to one another by swaging portions 243. At the central portion of the rotor core 24, the motor shaft 23 passes through. Moreover, in the rotor core 24, eight holes 242 are provided. By providing these holes 242, an effect can be achieved as obtaining weight reduction and inertia reduction of the rotor core 24.

Next, in the permanent magnet motor according to Embodiment 1 of the present invention, the explanation will be made for the reasons why torque ripples are reduced. As illustrated in FIG. 3, the number of the slots 142 in the stator core 14 of the motor 5 is "48," and the number of poles is "8," thereby revealing that the slot pitch is "360 degrees/ 48×4=30 degrees" in electrical angles. In addition, because the first armature winding 39 and the second armature winding 40 are accommodated in the adjacent slots, the phase-U1 and the phase-U2 have mutually a shifted phase by an electrical angle 30 degrees. The phase-V1 and the phase-V2, and the phase-W1 and the phase-W2 also have mutually the shifted phase by an electrical angle 30 degrees.

Accordingly, when, in the first armature winding 39 and the second armature winding 40, three-phase alternating currents are energized in which their phases are shifted mutually by an electrical angle of 30 degrees, the phases are reversed in a torque ripple in the sixth at an electrical angle produced by the magnetomotive force of the first armature winding 39, and a torque ripple in the sixth at an electrical angle produced by the magnetomotive force of the second armature winding 40, so that the torque ripples in the sixth at electrical angles are cancelled out. In order to flow electric currents with the different phases into the first armature winding 39 and the second armature winding 40, it is possible to implement the arrangement by providing two inverter circuits of the aforementioned first and second inverter circuits 41 and 42 illustrated in FIG. 2, and by performing individual controls, respectively. Note that, if a phase difference in the electric currents of the first armature winding 39 and the second armature winding 40 is in vicinity to 20 degrees through 40 degrees, similar effects can be obtained.

In FIG. 3, the rotor 502 includes the protrusion portions 241 formed in the rotor core 24, and the height of the protrusion portions 241 each is set so that, on the side nearer to the stator 501 than the middle diameter between the maximum outer diameter and the minimum outer diameter of the permanent magnets 26, an outer circumferential face of the rotor core 24, namely, an outer circumferential face of the protrusion portions 241 is positioned. In the configuration described above, reluctance torque can be obtained by utilizing changes in magneto-resistance of the rotor core 24. In a motor which produces reluctance torque, the field-weakening control effectively operates because the d-axis inductance is increased, so that the torque at the time of fast rotation is enhanced.

However, in the motor where the first armature winding 39 and the second armature winding 40 are accommodated in the mutually adjacent slots as illustrated in FIG. 3, the magnetic coupling between the first armature winding 39 and the second armature winding 40 becomes significant, in a case in which the rotor core 24 is provided on the side nearer to the stator 501 than the middle diameter between the maximum outer diameter and the minimum outer diameter of the permanent magnets 26, in comparison with a case other than this. This is because the rotor core 24 being nearer to the stator 501 has a working-effect to lower the magneto-resistance between the first armature winding 39 and the second armature winding 40.

Figure 4:
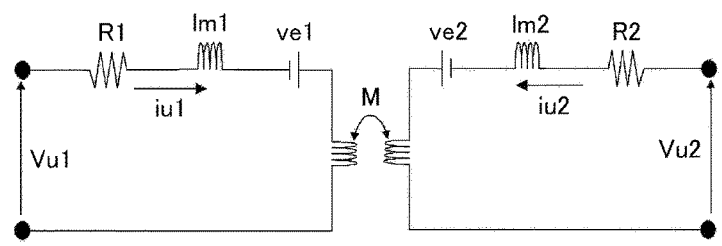
FIG. 4 is an illustrative diagram for explaining an equivalent circuit of an armature winding of a permanent magnet motor according to Embodiment 1 of the present invention.

FIG. 4 is an illustrative diagram for explaining an equivalent circuit of the armature winding of the permanent magnet motor according to Embodiment 1 of the present invention. In FIG. 4, Vu designates each terminal voltage of the armature winding; iu, armature current; R, resistance; ve, induced voltage; lm, leakage inductance; and M, mutual inductance. The suffix "1" indicates the primary side; and the suffix "2," the secondary side. In addition, symbol "n" corresponds to a turn ratio in a transformer. Note that, in these values, the symbols lm and M indicate in particular, differ from those values used in a usual motor control, quantities of inductance between two phase in multiple structures placed in parallel with each other. Moreover, because the numbers of windings of those windings connected in parallel with one another are generally the same in a multi-structured multi-phase winding alternating-current motor, "n=1." Because equivalent circuits of the phase-V1 and the phase-V2, the phase-W1 and the phase-W2, the phase-U1 and the phase-V2, the phase-U1 and the phase-W2, the phase-V1 and the phase-U2, the phase-V1 and the phase-W2, the phase-W1 and the phase-U2, and the phase-W1 and the phase-V2 are also the same as that in FIG. 4, an equivalent circuit in the d-q axes is the same as the equivalent circuit shown in FIG. 4, even when coordinates conversion is performed from the three phases including the phase-U, the phase-V and the phase-W, in the case of three-phase balance, to the d-q axes of the rotor.

Figure 5:
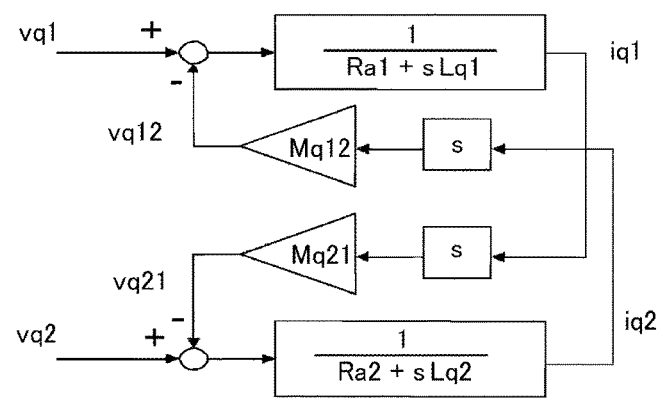
FIG. 5 is an illustrative diagram for a q-axis circuit configuration of a permanent magnet motor according to Embodiment 1 of the present invention.

FIG. 5 is an illustrative diagram for a q-axis circuit configuration of the permanent magnet motor according to Embodiment 1 of the present invention, and illustrates a q-axis equivalent circuit in a block diagram form when the coordinates conversion is performed to the rotor's d-q axes. In FIG. 5, vq1 and vq2 designate q-axis voltages of the first armature winding and the second armature winding, respectively; iq1 and iq2, q-axis currents of the first armature winding and the second armature winding, respectively; Lq1 and Lq2, q-axis components of self inductance of the first armature winding and the second armature winding, respectively; Ra1 and Ra2, resistance components of the first armature winding and the second armature winding, respectively; and Mq12 and Mq21, q-axis components of mutual inductance between the first armature winding and the second armature winding, respectively. Symbol "s" designates a differential operator of the Laplace transform. Symbols vq12 and vq21 designate disturbance voltages superimposed on the first armature winding and the second armature winding due to mutual inductance between the first armature winding and the second armature winding, respectively. Note that, FIG. 5 is a diagram showing the equivalent circuit on the rotor's q-axis; however, an equivalent circuit on the rotor's d-axis is in a similar configuration.

Because the disturbance voltages are proportional to the differential values that are control response frequencies of electric currents, the disturbance voltages become larger as fast as the electric currents are controlled by the motor control, so that the motor control becomes difficult to cancel out the torque ripples in high response frequencies.

Next, consideration will be given to an influence of the disturbance voltages in Embodiment 1 of the present invention. Here, as is clear from FIG. 5, in a multi-structured multi-phase winding alternating-current motor having the multi-structured armature windings as described above, the disturbance voltages mutually act, and act on a current control system as disturbance values iq1' and iq2'. The disturbance values iq1' and iq2' are given from the block diagram of the q-axis equivalent circuit in FIG. 5, as Equation (1) and Equation (2) described below, respectively.

$$i'_{q1} = -\frac{sM_{q12}i_{q2}}{R_{a1}+sL_{q1}} \quad \text{Equation (1)}$$

$$i'_{q2} = -\frac{sM_{q21}i_{q1}}{R_{a2}+sL_{q2}} \quad \text{Equation (2)}$$

Here, iq1, iq2 designate q-axis currents of the first armature winding and the second armature winding, respectively; Ra1, Ra2, resistance values of the first armature winding and the second armature winding, respectively; Lq1, Lq2, q-axis components of self inductance of the first armature winding and the second armature winding, respectively; and Mq12, Mq21, q-axis components of mutual inductance which indicates the interference between the first armature winding and the second armature winding.

When the frequencies for the electric current control become high, a Laplace transform's differential operator "s" becomes larger, and in addition, it is clear from Equation (1) and Equation (2) that the disturbance values each approximately depend on magnetic coupling Mq12/Lq1 or magnetic coupling Mq21/Lq2. When the magnetic coupling becomes stronger, the disturbance value is increased, so that, in accordance with the increased disturbance in a current control system, it is not possible to heighten the response in the current control system, resulting in decreasing the motor's controllability. Note that, it may be regarded as "Mq12/Lq1≅Mq21/Lq2," because the armature in the case of Embodiment 1 has a structure in which the first armature winding and the second armature winding are symmetrical with each other. Therefore, the explanation will be hereinafter made for the magnetic coupling as Mq12/Lq1.

In the motor where the first armature winding 39 and the second armature winding 40 are accommodated in the mutually adjacent slots 142 as illustrated in FIG. 3, there arises a problem in that the magnetic coupling Mq12/Lq1 between the first armature winding 39 and the second armature winding 40 becomes stronger, in a case in which the circumferential face of the rotor core 24 is positioned on the side nearer to the stator 501 than the middle diameter between the maximum outer diameter and the minimum outer diameter of the permanent magnets 26, in comparison with a case other than this, so that the motor's controllability is lowered.

Figure 6:
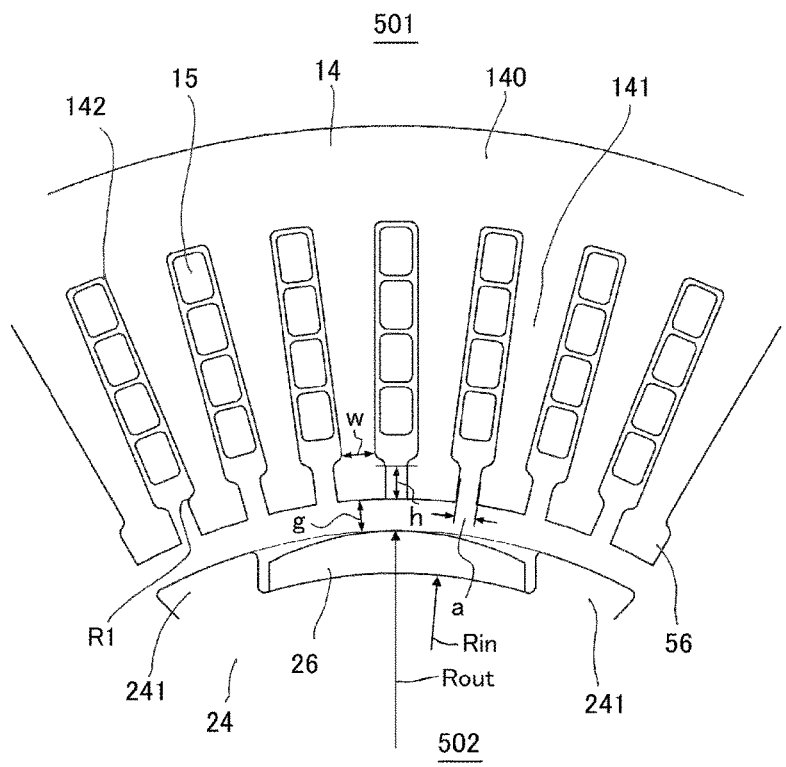
FIG. 6 is a cross section diagram illustrating an enlarged view of a stator core of a permanent magnet motor according to Embodiment 1 of the present invention.

FIG. 6 is a cross section diagram illustrating an enlarged view of the stator core of the permanent magnet motor according to Embodiment 1 of the present invention. In FIG. 6, the stator 501 is provided with the stator core 14 having the core back 140, the teeth 141 and the slots 142, and the armature windings 15 accommodated inside the slots 142. Although insulating paper or the like is provided between the armature windings 15 and the stator core 14 for securing the electrical insulation, such insulating paper is omitted in FIG. 6. At the front ends of the teeth 141, flanges 56 are provided. In FIG. 6, the width of the narrowest portions of the teeth 141 is indicated as "w"; the distance of the adjacent flanges 56, as "a"; and a radial height between opposing faces of the adjacent flanges 56 of the stator core 14, as "h." Curved face portions R1 are provided on the inner radial sides of faces where the adjacent flanges 56 are opposing to each other. The height "h" is defined as the height of regions excluding the curved face portions R1. According to the motor for EPS usage, the curved face portions R1 each are set in the degree of 0.2 [mm] through 0.4 [mm].

The rotor 502 takes a configuration of the rotor core 24 and the permanent magnets 26 which are placed on the surface of the rotor core, and the protrusion portions 241 are formed on both sides of the permanent magnets 26. The protrusion portions 241 protrude toward the side of the inner circumferential face of the stator 501; the height of the protrusion portions each is set so that they protrude on the side nearer to the stator 501 than the middle diameter between the maximum outer diameter Rout and the minimum outer diameter Rin of the permanent magnets 26. In order to prevent scattering the permanent magnets 26, there also arises a case in which the outer circumferential face of the rotor 502 is covered overall by a pipe made of a non-magnetic metal such as SUS or aluminum; however, the pipe is omitted in FIG. 6. The length of a magnetic air gap between the outer circumferential face of the rotor 502 and the inner circumferential face of the stator 501 is "g." When the outer circumferential face of the rotor 502 is covered by a pipe made of a metal, the thickness of the pipe made of a metal is included in the length of the magnetic air gap.

In FIG. 6, the configuration is taken so that the relationship "$1 \leq h/g \leq 2$" is held between the radial height "h" of the faces where the adjacent flanges 56 of the stator core 14 are opposing to each other, and the length "g" of the magnetic air gap. In addition, the configuration is taken so that the relationship "$a/g \geq 0.2$" is satisfied between a circumferential distance "a" between the faces where the adjacent flanges 56 of the stator core are opposing to each other, and the length "g" of the magnetic air gap.

By taking the configuration described above, the leakage flux increases between the adjacent flanges 56, so that the inductance Lq1 increases. Meanwhile, in order to interlink magnetic flux through different groups of the armature windings 15, the magnetic flux must pass twice through the faces where the adjacent flanges 56 are opposing to each other; however, the interlinkage flux can be reduced, because "$a/g \geq 0.2$" being defined. Accordingly, an effect can be achieved as obtaining a value of Mq12 which becomes smaller. As a result, a value of Mq12/Lq1 can be made smaller, so that the motor's controllability can be enhanced. For this reason, it can be namely said that ensuring both an effect of the field-weakening control due to the increase in the inductance, and the reduction in the magnetic coupling has hitherto been difficult, but both of them can be ensured.

Figure 7A:
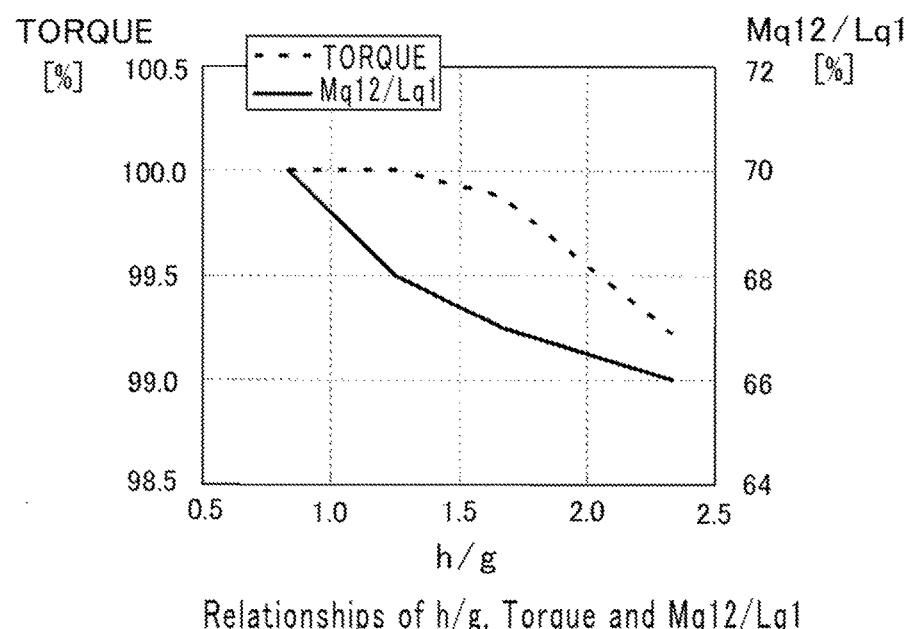
FIGS. 7A and 7B are illustrative diagrams for explaining the magnetic coupling between a first armature winding and a second armature winding of a permanent magnet motor according to Embodiment 1 of the present invention.
Figure 7B:
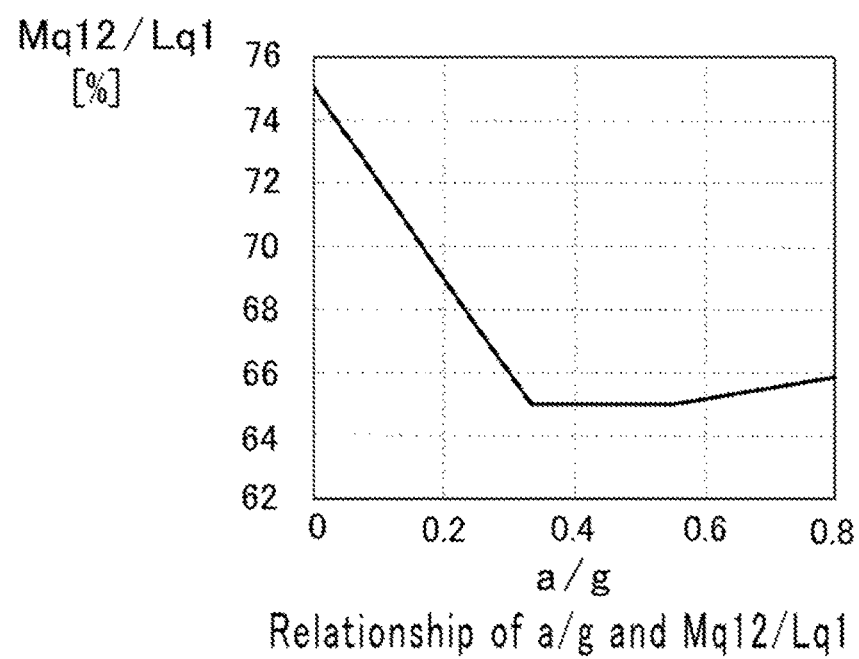

FIGS. 7A and 7B are illustrative diagrams for explaining the magnetic coupling between the first armature winding and the second armature winding of the permanent magnet motor according to Embodiment 1 of the present invention. FIG. 7A shows the relationships among: a radial height "h" of the faces where the adjacent flanges 56 are opposing to each other, and the length "g" of the magnetic air gap; motor's torque; and magnetic coupling. The horizontal axis indicates h/g, and the vertical axes indicate the torque and the magnetic coupling. As for the torque, the percent values are indicated by setting the torque at 100 [%] when "h/g=0.83,", and, as for the magnetic coupling, Mq12/Lq1 [%] is indicated. By taking "$h/g \leq 2$," the leakage flux into the adjacent teeth 141 can be reduced, so that the reduction of torque becomes slightly 0.5 [%] or less. On the other hand, by taking "$1 \leq h/g$," the magnetic coupling Mq12/Lq1 becomes a value of 69 [%] or less, so that there exists an effect that a frequency response of the control can be heightened, and a frequency response required for the motor control of the electric power steering apparatus (EPS) can be obtained.

Meanwhile, FIG. 7B is the diagram showing the relationship between: a circumferential distance "a" between opposing faces of the adjacent flanges 56 in the teeth 141 of the stator core 14, and the length "g" of a magnetic air gap between the rotor 502 and the stator 501; and the magnetic coupling. The horizontal axis indicates a/g, and the vertical axis indicates the magnetic coupling Mq12/Lq1. By taking "$a/g \geq 0.2$," the magnetic coupling Mq12/Lq1 becomes a value of 69 [%] or less, so that such an effect can be achieved that a frequency response of the control can be heightened, and a frequency response required for the motor control of electric power steering can be obtained.

Figure 8:
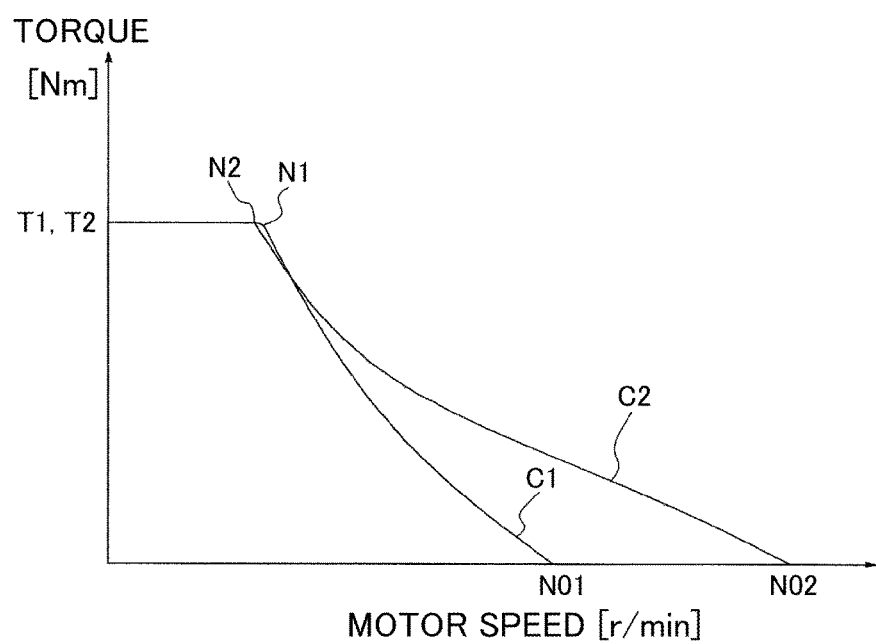
FIG. 8 is an illustrative diagram for explaining NT (speed-torque) characteristics of a permanent magnet motor according to Embodiment 1 of the present invention.

FIG. 8 is an illustrative diagram for explaining NT (speed-torque) characteristics of the permanent magnet motor according to Embodiment 1 of the present invention, and the relationships between a motor's rotational speed N and torque T are shown; the horizontal axis indicates the motor's rotational speed N [r/min], and the vertical axis indicates the torque T [Nm]. The comparison is made and shown for two kinds of motor (1) and motor (2) having the same rated torque. It can be known that the rated torque T1=T2. The suffix "1" indicates the motor (1), and the suffix "2," the motor (2).

In FIG. 8, the curve C1 indicates the characteristic of the motor (1), exemplifying a motor of a surface permanent magnet type in which the rotor core 24 is not provided on the side nearer to the stator 501 than the middle diameter between the maximum outer diameter and the minimum outer diameter of the permanent magnets 26. The curve C2 indicates the characteristic of the motor (2), exemplifying a case in which the rotor core 24 is provided on the side nearer to the stator 501 than the middle diameter between the maximum outer diameter and the minimum outer diameter of the permanent magnets 26, namely, the case of the permanent magnet motor according to Embodiment 1 of the present invention.

When the rotor core 24 is provided on the side nearer to the stator 501 than the middle diameter between the maximum outer diameter and the minimum outer diameter of the permanent magnets 26 as the case of the motor (2), the torque at the time of fast rotation is enhanced (curve C2), because the inductance is increased, and the field-weakening control exerts its effect. When the comparison is made in the numbers of no-load revolutions, it can be known that N01<N02. Meanwhile, the numbers of rated revolutions N1 and N2 are approximately in coincidence with each other. Therefore, it can be understood that the rated output of the motor (2) is approximately equivalent in comparison with that of the motor (1), and the torque in the high revolution range is enhanced to a large extent. When the rotor core 24 is provided on the side nearer to the stator 501 than the middle diameter between the maximum outer diameter and the minimum outer diameter of the permanent magnets 26 as the conventional technology, the magnetic coupling of different groups of armature windings each other is strong, so that the controllability is lowered; however, according to the configuration in Embodiment 1 of the present invention, the reduction in the magnetic coupling can be achieved.

Modification Example 1 of Embodiment 1

Figure 9:
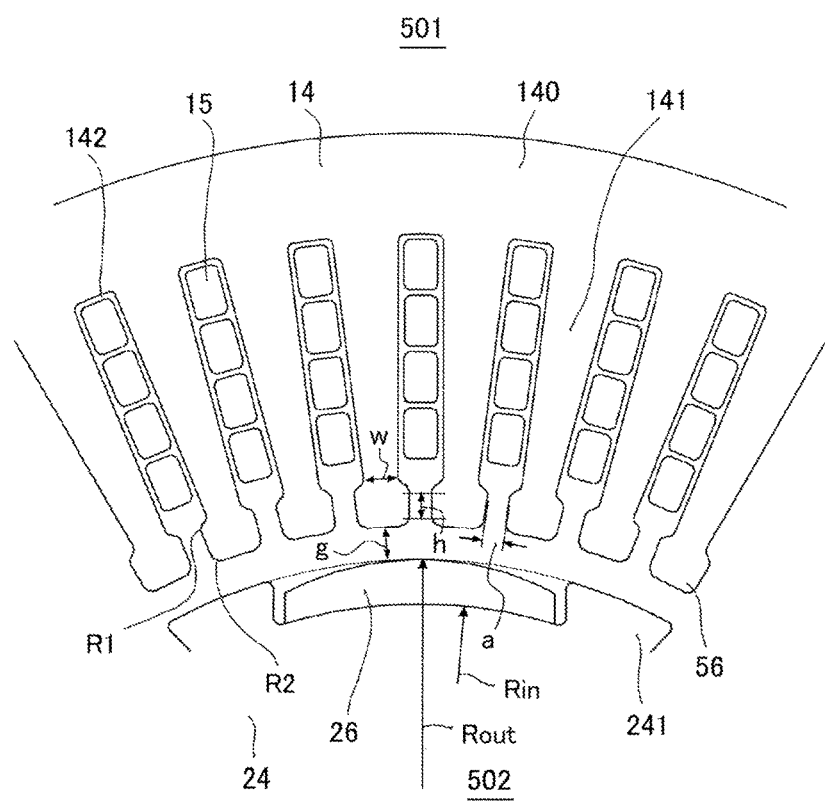
FIG. 9 is a cross section diagram illustrating an enlarged view of a stator core in Modification Example 1 of a permanent magnet motor according to Embodiment 1 of the present invention.

FIG. 9 is a cross section diagram illustrating an enlarged view of a stator core in Modification Example 1 of the permanent magnet motor according to Embodiment 1 of the present invention. In the permanent magnet motor illustrated in FIG. 9, the configuration is taken in which the relationship "$1 \leq h/g \leq 2$" is held between a radial height "h" of the faces where the adjacent flanges 56 are opposing to each other in the teeth 141 of the stator core 14, and the length "g" of the magnetic air gap.

In addition, the configuration is taken in which the relationship "$a/g \geq 0.2$" is satisfied between a circumferential distance "a" between opposing faces of the adjacent flanges 56 in the teeth 141 of the stator core 14, and the length "g" of a magnetic air gap. Moreover, the curved face portions R1 are provided on the inner radial sides of faces where the adjacent flanges 56 are opposing to each other, and also curved face portions R2 are provided on the outer radial sides. The height "h" is defined as the height of regions excluding the curved face portions R1 and R2.

According to the motor for EPS usage, the curved face portions R1 and R2 each are set in the degree of 0.2 [mm] through 0.4 [mm]. It is needless to say that the effect described in the explanation of FIG. 6 can be obtained by taking the configuration described above; in addition, by providing the curved face portions R1 and R2, there exists an effect that the magneto-resistance increases between the curved face portions R1 and R2 of the adjacent flanges 56, and the magnetic coupling can be weakened. Moreover, by providing the curved face portions R1 and R2 on both the inner radial side and outer radial side, there also exists an effect that stamping of electrical steel sheets by die-cutting becomes easier, and the life of dies is prolonged.

Even when the curved face portions each are provided on either one of the inner radial side and outer radial side, such an effect can be achieved that the magneto-resistance increases between the curved face portions of the adjacent flanges, so that the magnetic coupling can be weakened.

Modification Example 2 of Embodiment 1

Figure 10:
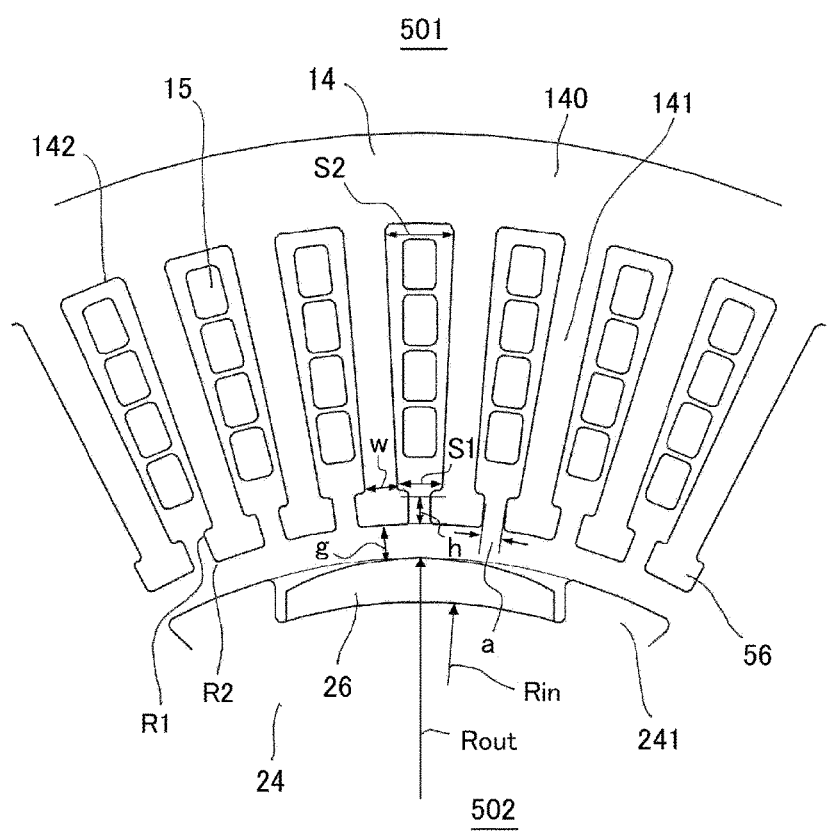
FIG. 10 is a cross section diagram illustrating an enlarged view of a stator core in Modification Example 2 of a permanent magnet motor according to Embodiment 1 of the present invention.

FIG. 10 is a cross section diagram illustrating an enlarged view of a stator core in Modification Example 2 of the permanent magnet motor according to Embodiment 1 of the present invention. In Modification Example 2 illustrated in FIG. 10, when the width of the teeth 141, on the outer radial side than the flanges 56, in the portions where the teeth 141 become the narrowest is defined as "w"; the maximum outer diameter of the rotor core 24, as Rout; and the number of slots, as Ns, the configuration takes to hold the following Equation (3).

$$0.4 \times 2\pi(Rout+g+h)/Ns \leq w \leq 0.5 \times 2\pi(Rout+g+h)/Ns \quad \text{Equation (3)}$$

For example, when magnetic flux density in a motor's gap of the motor using a rare-earth magnet of neodymium-iron-boron system for the permanent magnets 26 is 0.8 T, and in a case in which magnetic flux entirely passes through the teeth 141 under the condition where Equation (3) is held, the maximum value of magnetic flux density becomes approximately in the degree of 1.6 T through 2.0 T in the portions where the teeth 141 become the narrowest. According to this arrangement, because magnetic saturation can be mitigated in the portions where the teeth 141 become the narrowest, the rated torque is enhanced. In addition, because the self inductance becomes larger due to the mitigation of magnetic saturation, such an effect can be achieved as reducing the magnetic coupling Mq12/Lq1, so that the controllability is enhanced.

In addition, when a circumferential width of the slots 142 in the portions where the teeth 141 become the narrowest is defined as S1, the relationship w≤S1 is given. This is because the slot's width is equal to or larger than the width of the teeth, large cross-sectional areas of the slots can be secured. As a result, large cross-sectional areas of the armature windings can additionally be secured, there also exists an effect that the reduction of copper losses and output enhancement of the motor can be achieved.

From the relationships between Equation (3) described above, and "S1+w=2π(Rout+g+h)/Ns," for S1

$$0.5 \times 2\pi(Rout+g+h)/Ns \leq S1 \leq 0.6 \times 2\pi(Rout+g+h)/Ns \quad \text{Equation (4)}$$

can be expressed. According to this configuration, the maximum value of magnetic flux density becomes approximately in the degree of 1.6 T through 2.0 T in the portions where the teeth 141 become the narrowest as described above. According to this arrangement, because the magnetic saturation can be mitigated in the portions where the teeth 141 become the narrowest, the rated torque is enhanced.

Moreover, because the self inductance becomes larger due to the mitigation of magnetic saturation, such an effect can be achieved as reducing the magnetic coupling Mq12/Lq1, so that the controllability is enhanced. In addition, as illustrated in FIG. 10, the configuration is so adopted that a slot's circumferential width becomes larger in accordance with a position toward an outer radial side, and that the width of the slots becomes the maximum value of S2 in the vicinity of the core back. By taking the configuration described above, there exists an effect that the leakage flux leaking between the adjacent teeth 141 can be reduced, and the motor's torque can be enhanced, so that the quantity of permanent magnet use can be reduced. In addition, because large cross-sectional areas of the slots can be secured in comparison with a configuration in which the width of the slots 142 is constant, there also exists an effect that large cross-sectional areas of the armature windings 15 can additionally be secured, and copper losses can be reduced, so that the motor's output can be enhanced.

Up to this time, the examples are described in which two armature windings in total of the first armature winding 39 and the second armature winding 40; however, similar effects can be obtained even in multi-structured windings having three or more armature windings.

By mounting the permanent magnet motor of Embodiment 1 described above on an electric power steering apparatus, a large quantity of torque-ripple reduction in the sixth is made possible. Although there arises a problem in that the magnetic coupling becomes stronger at the same time of increased output of the motor, and that the motor's controllability is lowered, the magnetic coupling can be reduced, so that such an effect can be additionally achieved as applying the electric power steering apparatus also to a large-size wheeled vehicle, and lowering fuel consumption. In particular, because the motor described above is low in vibration and low in noise even when its output is high, the motor is suitable for an electric power steering apparatus in which the motor is placed in an orientation parallel with a moving direction of a rack shaft used for an application of the high output.

Embodiment 2

Figure 11:
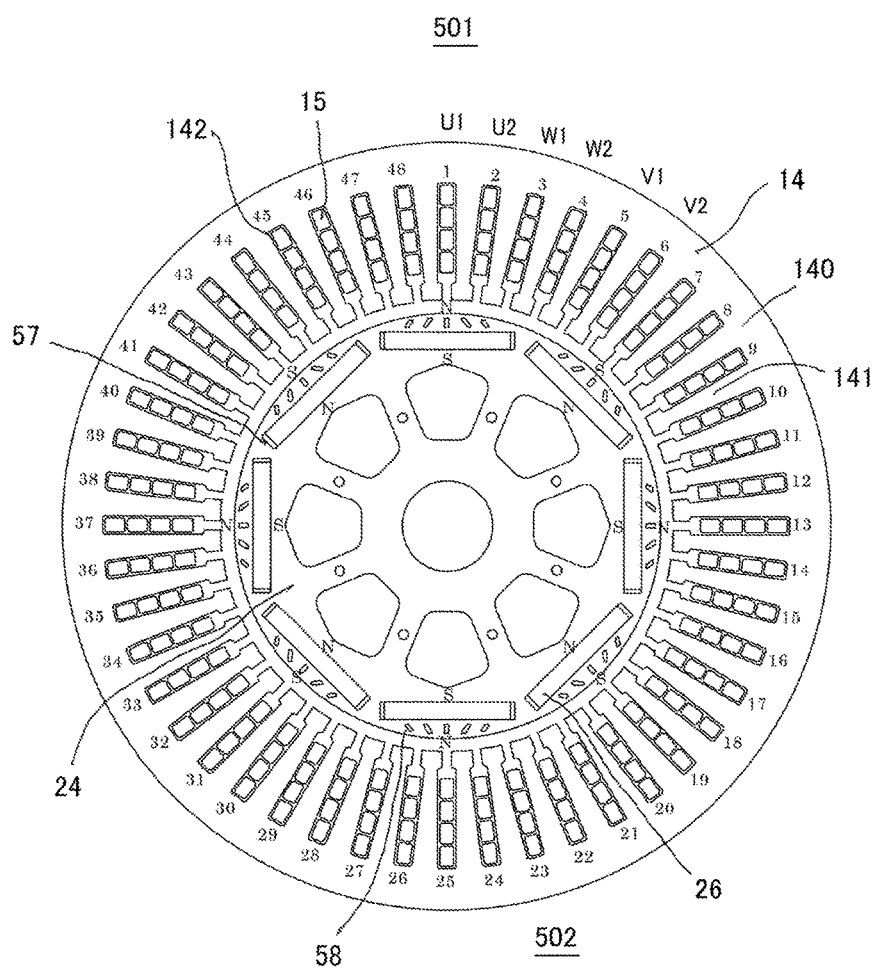
FIG. 11 is a cross section diagram illustrating a permanent magnet motor according to Embodiment 2 of the present invention.

In Embodiment 1, the explanation has been made for the structure where the permanent magnets are placed on a surface of the rotor core; however, in Embodiment 2, a structure is adopted in which the permanent magnets are embedded in the rotor core to make a permanent magnet motor (IPM). FIG. 11 is a cross section diagram illustrating the permanent magnet motor according to Embodiment 2 of the present invention. In FIG. 11, the stator 501 takes the same structure as that in the case of FIG. 3 in Embodiment 1.

In the rotor 502, which differs from the case in FIG. 3, the permanent magnets 26 each in a planar shape are placed being embedded in permanent magnet hole-portions 57 formed in the rotor core 24. The permanent magnet hole-portions 57 are formed in an equal interspace therebetween, in the number of eight, in proximity at around an outer circumferential face of the rotor core 24 in a circumferential direction thereof, and the permanent magnets 26 are embedded one by one for each of the permanent magnet hole-portions 57. The permanent magnets 26 circumferentially neighboring to each other are placed so that their magnetic polarities are set in the reversed directions.

Moreover, on the side nearer to the stator 501 than the permanent magnets 26, slits 58 are provided in the rotor core 24. In FIG. 11, five slits are placed for each of the magnetic poles. In the slits 58, a non-magnetic material such as air or a resin is filled. The slits 58 each are slantingly placed so that magnetic flux is directed toward the center of magnetic pole. According to this arrangement, the motor's torque is increased, and a motor of a small size and high output can be obtained. In the rotor core 24, the holes 242 are provided. By providing the holes 242, weight reduction and inertia reduction can be achieved. The rotor core 24 is formed by laminating electrical steel sheets or the like, and the electrical steel sheets are mutually joined to one another by the swaging portions 243. In the center of the rotor core 24, the motor shaft 23 passes through.

As described above, in a case of the interior permanent magnet type, the rotor core 24 exists nearer to the stator core 14, so that the magneto-resistance between the stator core 14 and the rotor core 24 becomes smaller; as a result, such tendency can be observed that the magnetic coupling between the first armature winding 39 and the second armature winding 40 becomes stronger; however, by taking the structure as described in Embodiment 2, such an effect can be achieved as weakening the magnetic coupling, and enhancing the controllability. In addition, because reluctance torque can be used, the quantity of use of the permanent magnets 26 can be reduced. Moreover, because the inductance is increased, and the field-weakening control can exert its effect, so that such an effect can also be achieved that the torque at the time of fast rotation is enhanced.

Embodiment 3

Figure 12:
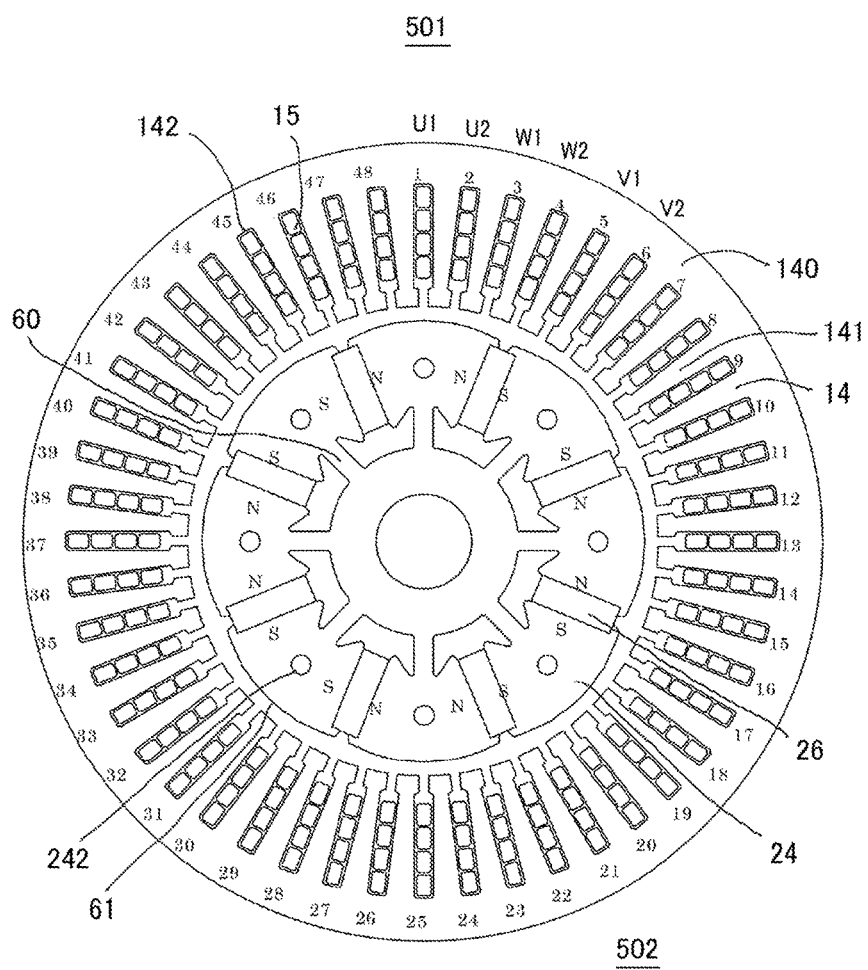
FIG. 12 is a cross section diagram illustrating a permanent magnet motor according to Embodiment 3 of the present invention.

FIG. 12 is a cross section diagram illustrating a permanent magnet motor according to Embodiment 3 of the present invention; the motor is referred to as a spoke (Spoke) type IPM. In FIG. 12, the stator 501 takes the same structure as that in the case of FIG. 3 in Embodiment 1. The rotor 502 has a structure different from that in the cases in FIG. 3 and FIG. 11 described above. In the rotor 502, the motor shaft 23 being the rotational shaft, and the rotor core 24 are provided in the outer side of the motor shaft 23.

The permanent magnets 26 each take shapes in such a manner that their radial length is longer in comparison with their circumferential length, and these permanent magnets 26 are circumferentially placed side by side in an equal interspace therebetween, in the number of eight. As for the directions of magnetization of the permanent magnets 26, they are magnetized in such directions that the permanent magnets' N pole and S pole correspond to "N" and "S" shown in FIG. 12, respectively. Namely, the opposing faces of the adjacent permanent magnets 26 to each other are magnetized to mutually form the same magnetic pole. By taking the directions of magnetization described above, the magnetic flux is concentrated in the rotor core 24, so that there exists an effect that the magnetic flux density is heightened. In addition, the rotor core 24 interposes between the adjacent permanent magnets 26. Faces of the rotor core 24 opposing to the inner circumferential face of the stator 501, namely, the outer circumferential faces are formed in the shape of curved planes. And then, the shape of these curved planes each takes a protrusion-shape curved plane 61 so that the length of a gap to the stator 501 becomes smaller at the midpoint between the adjacent permanent magnets 26.

By taking the shape described above, an waveform of magnetic flux density produced in the air gap between the inner circumferential face of the stator 501 and the outer circumferential faces of the rotor 502 can be made smooth, so that cogging torque and the torque ripples can be reduced. Moreover, non-magnetic portions 59 are provided so that they contact with end faces toward radially inner sides of the permanent magnets 26. These non-magnetic portions 59 may be made of air, or may be adopted to be filled with a resin, or may be adopted in which a non-magnetic metal such as stainless or aluminum is inserted in them. By providing the non-magnetic portions 59 as described above, the leakage flux of the permanent magnets 26 can be reduced.

Interconnecting portions 60 are provided between portions of the rotor core 24 interposed by the adjacent permanent magnets 26, and portions of the rotor core 24 provided to surround the outer circumference of the motor shaft 23. These interconnecting portions 60 have workings to mechanically join between the rotor core 24 and the motor shaft 23. In the rotor core 24 between the adjacent permanent magnets 26, the holes 242 are provided. By making the holes 242 of air, an effect can be achieved as obtaining weight reduction and inertia reduction of the rotor 502.

In a case of the interior permanent magnet type, the rotor core 24 exists nearer to the stator core 14, so that the magneto-resistance between the stator core 14 and the rotor core 24 becomes smaller; as a result, such tendency can be observed that the magnetic coupling between the first armature winding 39 and the second armature winding 40 becomes stronger; however, by taking the configuration of Embodiment 3, such an effect can be achieved as weakening the magnetic coupling between the first armature winding 39 and the second armature winding 40, and enhancing the controllability. In addition, because reluctance torque can be used, the quantity of use of the permanent magnets 26 can be reduced. Moreover, because the inductance is increased, and the field-weakening control can exert its effect, so that such an effect can also be achieved that the torque at the time of fast rotation is enhanced.

Embodiment 4

Figure 13:
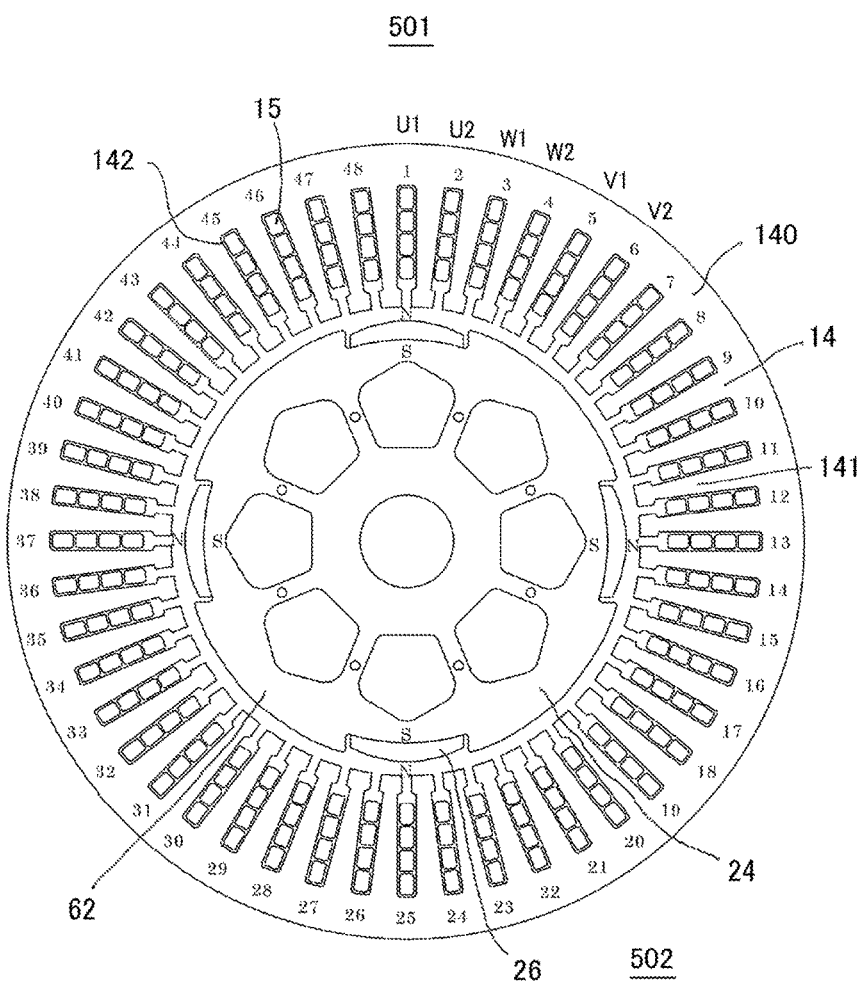
FIG. 13 is a cross section diagram illustrating a permanent magnet motor according to Embodiment 4 of the present invention.

FIG. 13 is a cross section diagram illustrating a permanent magnet motor according to Embodiment 4 of the present invention; the motor is referred to as a so-called permanent magnet motor of consequent-pole (consequent pole) type. In FIG. 13, the stator 501 takes the same structure as that in the case of FIG. 3 in Embodiment 1. The rotor 502 has a structure different from that in FIG. 3, FIG. 11 and FIG. 12. In the rotor 502, the motor shaft 23 being the rotational shaft, and the rotor core 24 are provided in the outer side of the motor shaft 23. On the surface of the rotor core 24, the permanent magnets 26 are placed, being circumferentially placed in an equal interspace therebetween, in the number of four.

As for the orientations of magnetization of the permanent magnets 26, they are magnetized in such a manner that the N poles are toward radially outer sides, and the S poles are toward radially inner sides, so that salient pole portions 62 of the rotor core 24 between the adjacent permanent magnets 26 presumably function as the S poles. Namely, the motor operates as a motor equivalent to the one with eight magnetic poles. This type of motor is generally referred to as a motor of consequent-pole type. The holes 242 of the rotor core 24 and the swaging portions 243 thereof are as described in FIG. 3 and FIG. 11.

In the motor of consequent-pole type as described above, the rotor core 24 exists nearer to the stator core 14, so that the magneto-resistance between the stator core 14 and the rotor core becomes smaller; as a result, such tendency can be observed that the magnetic coupling between the first armature winding 39 and the second armature winding 40 becomes stronger; however, by taking the structure as described in Embodiment 4, such an effect can be achieved as weakening the magnetic coupling, and enhancing the controllability. In addition, due to the reduction in the number of components of the permanent magnets 26, such an effect can be obtained as reducing the costs. Because the inductance is increased, and the field-weakening control can exert its effect, so that such an effect can also be achieved that the torque at the time of fast rotation is enhanced. Moreover, in FIG. 13, an example is shown in which the permanent magnets 26 are placed on a surface of the rotor core 24; however, it is needless to say that similar effects can be achieved even in a motor of the consequent-pole type having a structure in which the permanent magnets 26 are embedded in the rotor core 24 as illustrated in FIG. 11.

Note that, in the present invention, each of the embodiments can be freely combined, and each of the embodiments can be appropriately modified and/or eliminated without departing from the scope of the invention.

The permanent magnet motor according to each of the embodiments of the present invention described above gives a concrete form to any one of the inventions described below.

(1) A permanent magnet motor comprises:
a rotor including a rotor core fixed on a motor shaft, and permanent magnets fixed on the rotor core; and
a stator including a stator core, whose inner circumferential face opposes to an outer circumferential face of the rotor by means of a magnetic air gap, having a plurality of slots for accommodating armature windings, and a plurality of teeth, the permanent magnet motor is characterized in that:
the armature windings are constituted of a plurality of groups of multi-phase windings;
the plurality of groups of multi-phase windings is supplied with electric power from individual inverters in every one of respective groups;
portions of the rotor core exist on a side nearer to the stator than a middle diameter between a maximum outer diameter and a minimum outer diameter of the permanent magnets;
the plurality of teeth each include respective flanges;
the flanges each have a lateral side portion thereof opposing to a lateral side portion of a flange being provided in the teeth adjacent to each other and protruding in a circumferential direction of the stator core;
when a height in the lateral side portion of the flanges in a radial direction of the stator core is defined as h, and a length of the magnetic air gap is defined as g, relationship $1 \leq h/g \leq 2$ is held; and also,
when a circumferential distance between opposing faces of the flanges (56) being adjacent to each other is defined as a, relationship $a/g \geq 0.2$ is satisfied.

According to the permanent magnet motor as set forth in item (1) described above, such an effect can be achieved as weakening the magnetic coupling of different groups of armature windings each other, and enhancing the controllability. At the same time, an effect of the field-weakening control can be efficiently exerted.

(2) The permanent magnet motor as set forth in item (1) described above is characterized in that:
the armature windings are constituted of two groups of three-phase armature windings made of a first armature winding and a second armature winding;
the first armature winding is supplied with an electric current from a first inverter circuit;
the second armature winding is supplied with an electric current from a second inverter circuit;
the first armature winding includes a phase-U1 winding, a phase-V1 winding and a phase-W1 winding;
the second armature winding includes a phase-U2 winding, a phase-V2 winding and a phase-W2 winding;
the phase-U1 winding and the phase-U2 winding are side by side accommodated in the slots adjacent to each other;
the phase-V1 winding and the phase-V2 winding are side by side accommodated in the slots adjacent to each other;
the phase-W1 winding and the phase-W2 winding are side by side accommodated in the slots adjacent to each other; and
electric currents each flowing through the first armature winding and the second armature winding mutually have a phase difference of an electrical angle of twenty degrees or more, and an electrical angle of forty degrees or less.

According to the permanent magnet motor as set forth in item (2) described above, there exists an effect that both a large quantity of torque-ripple reduction in the sixth at an electrical angle, and the reduction in the magnetic coupling can be ensure.

(3) The permanent magnet motor as set forth in item (1) or item (2) described above is characterized in that the lateral side portion of the flanges includes a curved face portion on either one of a portion positioned on an inner radial side of the stator, and a portion positioned on an outer radial side thereof.

According to the permanent magnet motor as set forth in item (3) described above, such an effect can be achieved as increasing the magneto-resistance between the "R" portions of the adjacent flanges by providing the curved face portions, and weakening the magnetic coupling.

(4) The permanent magnet motor as set forth in item (1) or item (2) described above is characterized in that the lateral side portion of the flanges includes curved face portions on both a portion positioned on an inner radial side of the stator, and a portion positioned on an outer radial side thereof.

According to the permanent magnet motor as set forth in item (4) described above, such an effect can be achieved as increasing the magneto-resistance between the curved face portions of the adjacent flanges by providing the curved face portions, and weakening the magnetic coupling. In addition, there also exists an effect that, by providing the curved face portions on both the inner radial side and the outer radial side, stamping by die-cutting becomes easier, and the life of dies is prolonged.

(5) The permanent magnet motor as set forth in item (4) described above is characterized in that the lateral side portion of the flanges each provided on adjacent teeth and opposing to each other is formed to be side by side in parallel with the other lateral side portion.

According to the permanent magnet motor as set forth in item (5) described above, such an effect can be achieved as increasing the magneto-resistance between the curved face portions of the adjacent flanges by providing the curved face portions, and weakening the magnetic coupling. In addition, there also exists an effect that, by providing the curved face portions on both the inner radial side and the outer radial side, stamping by die-cutting becomes easier, and the life of dies is prolonged. Moreover, because the faces where the flanges oppose to each other are side by side in parallel with another face, the magneto-resistance becomes uniform in those portions. Because through these faces, magnetic flux leaks into the neighboring teeth, such an effect can be achieved as reducing in the magnetic coupling Mq12/Lq1, and, as a result, enhancing the motor's controllability.

(6) The permanent magnet motor as set forth in any one of items (1) through (5) described above is characterized in that, when a width of portions of the teeth, existing from the flanges on an outer radial side of the stator, where a circumferential width of the stator becomes a smallest is defined as w, a maximum outer diameter of the rotor core is defined as Rout, and the number of slots is defined as Ns, the width w of the portions of the teeth satisfies a relationship $$0.4 \times 2\pi(Rout+g+h)/Ns \leq w \leq 0.5 \times 2\pi(Rout+g+h)/Ns.$$

According to the permanent magnet motor as set forth in item (6) described above, because the magnetic saturation can be mitigated in the portions where the teeth become the narrowest, the self inductance is increased, so that such an effect can be achieved as reducing in the magnetic coupling Mq12/Lq1, and enhancing the controllability.

(7) The permanent magnet motor as set forth in any one of items (1) through (5) described above is characterized in that, when a circumferential width of the slots corresponding to a portion of the teeth, existing from the flanges on an outer radial side of the stator, where the circumferential width of the stator becomes a smallest is defined as S1, a maximum outer diameter of the rotor core is defined as Rout, and the number of slots is defined as Ns, the width S1 of the slots satisfies a relationship $$0.5 \times 2\pi(Rout+g+h)/Ns \leq S1 \leq 0.6 \times 2\pi(Rout+g+h)/Ns, \text{ and also}$$

the circumferential width of the slots gradually increases in accordance with a position on an outer radial side of the stator, and is maximized on a back-portion of the slots (142) or a back-portion's vicinity thereof.

According to the permanent magnet motor as set forth in item (7) described above, large cross-sectional areas of the slots can be secured, and thus, there also exists an effect that large cross-sectional areas of the armature windings can additionally be secured, so that copper losses can be reduced, and the motor's output can be enhanced. In addition, because a slot's circumferential width is large in the vicinity of the core back, there exists an effect that the magneto-resistance between the slots is increased so that the leakage flux is lowered, and there exists an effect that the motor's torque can be enhanced, and the quantity of permanent magnet use can be reduced.

(8) The permanent magnet motor as set forth in any one of items (1) through (7) described above is characterized in that:

the permanent magnets are placed on a surface of the rotor core opposing to the stator core;

the rotor core includes protrusion portions provided in portions where the permanent magnets are not placed; and a gap is provided between the protrusion portions and the permanent magnets.

According to the permanent magnet motor as set forth in item (8) described above, the protrusion portions have an effect to shorten the motor's air gap, so that the inductance is increased. According to this configuration, the field-weakening control facilitates exerting its effect, so that there exists an effect that the torque at the time of fast rotation can be enhanced. Meanwhile, there arises a problem in that, because of the existence in the protrusion portions of the rotor core, magnetic coupling of different groups of armature windings each other becomes stronger; however, there exists an effect that the magnetic coupling can be weakened according to the configuration of the present invention.

(9) The permanent magnet motor as set forth in any one of items (1) through (7) described above is characterized in that the permanent magnets are placed in hole-portions formed in the rotor core.

According to the permanent magnet motor as set forth in item (9) described above, the field-weakening control can be efficiently used because the inductance is increased, so that such an effect can be achieved that the torque at the time of fast rotation is enhanced. Because a protective pipe to prevent scattering the permanent magnets 26 becomes unnecessary, there exists an effect that the costs can be lowered. Meanwhile, there arises a problem in that, because the magnetic gap between the rotor core and the stator core is small, magnetic coupling of different groups of armature windings each other becomes stronger; however, there exists an effect that the magnetic coupling can be weakened according to the configuration of the present invention.

(10) The permanent magnet motor as set forth in any one of items (1) through (7) described above is characterized in that:

the permanent magnets are formed such that a length thereof in a radial direction of the rotor is larger in comparison with a length in a circumferential direction thereof;

directions of magnetization of the permanent magnets are in such orientations that faces of the adjacent permanent magnets opposing to each other mutually form an identical magnetic pole;

the rotor core interposes between the adjacent permanent magnets;

the rotor core has curved-plane portions on faces opposing to the stator core, and also includes non-magnetic portions provided at positions contacting with end faces toward radially inner sides of the permanent magnets; and the curved-plane portions each are formed in a protrusion shape so that, in a middle portion between the adjacent permanent magnets, a length of the magnetic air gap is smaller than that of another portion.

According to the permanent magnet motor as set forth in item (10) described above, there exists an effect that, by concentrating magnetic flux of the permanent magnets so that the magnetic flux density is heightened, the torque can be enhanced, and the motor, be small-sized. By forming a curved plane in a protrusion shape, the reduction of the torque ripples and cogging torque can be achieved. By providing the non-magnetic portions on the radially inner sides of the permanent magnets, the leakage flux is lowered, so that such an effect can be achieved as enhancing the torque and obtaining a motor being small-sized. Meanwhile, there arises a problem in that, because the magnetic gap between the rotor core and the stator core is small, magnetic coupling of different groups of armature windings each other becomes stronger; however, there exists an effect that the magnetic coupling can be weakened according to the configuration of the present invention.

(11) An electric power steering apparatus on which a permanent magnet motor as set forth in any one of items (1) through (10) described above is mounted, and torque is produced by the permanent magnet motor so as to assist steering of a driver, is characterized in that the permanent magnet motor is placed in such a direction that the motor shaft is in parallel with an extending direction of a rack shaft for driving a steering wheel of a wheeled vehicle.

According to the electric power steering apparatus as set forth in item (11) described above, a large quantity of torque-ripple reduction in the sixth is made possible. In addition, there arises a problem in that the magnetic coupling becomes stronger at the same time of increased output

What is claimed is:

1. A permanent magnet motor, comprising:
a rotor including a rotor core fixed on a motor shaft, and permanent magnets fixed on the rotor core; and
a stator including a stator core, whose inner circumferential face opposes to an outer circumferential face of the rotor by means of a magnetic air gap, having a plurality of slots for accommodating armature windings, and a plurality of teeth, the permanent magnet motor characterized in that:
the armature windings are constituted of a plurality of groups of multi-phase windings;
the plurality of groups of multi-phase windings is supplied with electric power from individual inverters in every one of respective groups;
the plurality of teeth each include respective flanges;
the flanges each have a lateral side portion thereof opposing to a lateral side portion of a flange being provided in the teeth adjacent to each other and protruding in a circumferential direction of the stator core;
when a height in the lateral side portion of the flanges in a radial direction of the stator core is defined as h, and a length of the magnetic air gap is defined as g, relationship $1 \leq h/g \leq 2$ is held; and also,
when a circumferential distance between opposing faces of the flanges being adjacent to each other is defined as a, relationship $a/g \geq 0.2$ is satisfied, wherein,
when a width of portions of the teeth, existing from the flanges on an outer radial side of the stator, where a circumferential width of the stator becomes a smallest is defined as w, a maximum outer diameter of the rotor core is defined as Rout, and the number of slots is defined as Ns, the width w of the portions of the teeth satisfies a relationship $0.4 \times 2\pi(Rout+g+h)/Ns \leq w \leq 0.5 \times 2\pi(Rout+g+h)/Ns$.

2. The permanent magnet motor as set forth in claim 1, wherein
the armature windings are constituted of two groups of three-phase armature windings made of a first armature winding and a second armature winding;
the first armature winding is supplied with an electric current from a first inverter circuit;
the second armature winding is supplied with an electric current from a second inverter circuit;
the first armature winding includes a phase-U1 winding, a phase-V1 winding and a phase-W1 winding;
the second armature winding includes a phase-U2 winding, a phase-V2 winding and a phase-W2 winding;
the phase-U1 winding and the phase-U2 winding are side by side accommodated in the slots adjacent to each other;
the phase-V1 winding and the phase-V2 winding are side by side accommodated in the slots adjacent to each other;
the phase-W1 winding and the phase-W2 winding are side by side accommodated in the slots adjacent to each other; and
electric currents each flowing through the first armature winding and the second armature winding mutually have a phase difference of an electrical angle of twenty degrees or more, and an electrical angle of forty degrees or less.

3. The permanent magnet motor as set forth in claim 1, wherein the lateral side portion of the flanges includes a curved face portion on either one of a portion positioned on an inner radial side of the stator, and a portion positioned on an outer radial side thereof.

4. The permanent magnet motor as set forth in claim 1, wherein the lateral side portion of the flanges includes curved face portions on both a portion positioned on an inner radial side of the stator, and a portion positioned on an outer radial side thereof.

5. The permanent magnet motor as set forth in claim 1, wherein the lateral side portion of the flanges each provided on adjacent teeth and opposing to each other is formed to be side by side in parallel with the other lateral side portion.

6. The permanent magnet motor as set forth in claim 1, wherein
the permanent magnets are placed on a surface of the rotor core opposing to the stator core;
the rotor core includes protrusion portions provided in portions where the permanent magnets are not placed; and
a gap is provided between the protrusion portions and the permanent magnets.

7. The permanent magnet motor as set forth in claim 1, wherein the permanent magnets are placed in hole-portions formed in the rotor core.

8. The permanent magnet motor as set forth in claim 1, wherein
the permanent magnets are formed such that a length thereof in a radial direction of the rotor is larger in comparison with a length in a circumferential direction thereof;
directions of magnetization of the permanent magnets are in such orientations that faces of the adjacent permanent magnets opposing to each other mutually form an identical magnetic pole;
the rotor core interposes between the adjacent permanent magnets;
the rotor core has curved-plane portions on faces opposing to the stator core, and also includes non-magnetic portions provided at positions contacting with end faces toward radially inner sides of the permanent magnets; and
the curved-plane portions each are formed in a protrusion shape so that, in a middle portion between the adjacent permanent magnets, a length of the magnetic air gap is smaller than that of another portion.

9. An electric power steering apparatus on which
a permanent magnet motor as set forth in claim 1 is mounted, and torque is produced by the permanent magnet motor so as to assist steering of a driver, the electric power steering apparatus characterized in that the permanent magnet motor is placed in such a direction that the motor shaft is in parallel with an extending direction of a rack shaft for driving a steering wheel of a wheeled vehicle.

10. A permanent magnet motor, comprising:

a rotor including a rotor core fixed on a motor shaft, and permanent magnets fixed on the rotor core; and a stator including a stator core, whose inner circumferential face opposes to an outer circumferential face of the rotor by means of a magnetic air gap, having a plurality of slots for accommodating armature windings, and a plurality of teeth, the permanent magnet motor characterized in that:

the armature windings are constituted of a plurality of groups of multi-phase windings;

the plurality of groups of multi-phase windings is supplied with electric power from individual inverters in every one of respective groups;

the plurality of teeth each include respective flanges;

the flanges each have a lateral side portion thereof opposing to a lateral side portion of a flange being provided in the teeth adjacent to each other and protruding in a circumferential direction of the stator core;

when a height in the lateral side portion of the flanges in a radial direction of the stator core is defined as h, and a length of the magnetic air gap is defined as g, relationship $1 \leq h/g \leq 2$ is held; and also, when a circumferential distance between opposing faces of the flanges being adjacent to each other is defined as a, relationship $a/g \geq 0.2$ is satisfied, wherein, when a circumferential width of the slots corresponding to a portion of the teeth, existing from the flanges on an outer radial side of the stator, where the circumferential width of the stator becomes a smallest is defined as S1, a maximum outer diameter of the rotor core is defined as Rout, and the number of slots is defined as Ns, the width S1 of the slots satisfies a relationship $0.5 \times 2\pi(Rout+g+h)/Ns \leq S1 \leq 0.6 \times 2\pi(Rout+g+h)/Ns$, and also the circumferential width of the slots gradually increases in accordance with a position on an outer radial side of the stator, and is maximized on a back-portion of the slots or a back-portion's vicinity thereof.

11. The permanent magnet motor as set forth in claim 10, wherein the permanent magnets are placed on a surface of the rotor core opposing to the stator core;

the rotor core includes protrusion portions provided in portions where the permanent magnets are not placed; and a gap is provided between the protrusion portions and the permanent magnets.

12. The permanent magnet motor as set forth in claim 10, wherein the permanent magnets are placed in hole-portions formed in the rotor core.

13. The permanent magnet motor as set forth in a claim 10, wherein the permanent magnets are formed such that a length thereof in a radial direction of the rotor is larger in comparison with a length in a circumferential direction thereof;

directions of magnetization of the permanent magnets are in such orientations that faces of the adjacent permanent magnets opposing to each other mutually form an identical magnetic pole;

the rotor core interposes between the adjacent permanent magnets;

the rotor core has curved-plane portions on faces opposing to the stator core, and also includes non-magnetic portions provided at positions contacting with end faces toward radially inner sides of the permanent magnets; and the curved-plane portions each are formed in a protrusion shape so that, in a middle portion between the adjacent permanent magnets, a length of the magnetic air gap is smaller than that of another portion.

14. An electric power steering apparatus on which a permanent magnet motor as set forth in claim 10 is mounted, and torque is produced by the permanent magnet motor so as to assist steering of a driver, the electric power steering apparatus characterized in that the permanent magnet motor is placed in such a direction that the motor shaft is in parallel with an extending direction of a rack shaft for driving a steering wheel of a wheeled vehicle.

* * * * *